| 
US007929801B2

(12) United States Patent
Nakamura et al.

(10) Patent No.: US 7,929,801 B2
(45) Date of Patent: Apr. 19, 2011

(54) DEPTH INFORMATION FOR AUTO FOCUS USING TWO PICTURES AND TWO-DIMENSIONAL GAUSSIAN SCALE SPACE THEORY

(75) Inventors: Makibi Nakamura, Tokyo (JP); Earl Quong Wong, Vallejo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 410 days.

(21) Appl. No.: 11/204,942

(22) Filed: Aug. 15, 2005

(65) Prior Publication Data

US 2007/0036427 A1 Feb. 15, 2007

(51) Int. Cl.
*G06K 9/36* (2006.01)
*G06K 9/40* (2006.01)

(52) U.S. Cl. .................. 382/285; 382/264; 382/265

(58) Field of Classification Search .................. 382/154, 382/285, 246, 265
See application file for complete search history.

(56) References Cited

U.S. PATENT DOCUMENTS

| 4,751,570 A | 6/1988 | Robinson |
| 4,947,347 A | 8/1990 | Sato |
| 4,965,840 A | 10/1990 | Subbarao |
| 5,148,209 A | 9/1992 | Subbarao |
| 5,212,516 A | 5/1993 | Yamada et al. |
| 5,365,597 A | 11/1994 | Holeva |
| 5,432,331 A | 7/1995 | Wertheimer |
| 5,577,130 A | 11/1996 | Wu |
| 5,604,537 A | 2/1997 | Yamazaki et al. |
| 5,703,637 A | 12/1997 | Miyazaki et al. |
| 5,752,100 A | 5/1998 | Schrock |
| 5,793,900 A | 8/1998 | Nourbakhsh et al. |
| 6,023,056 A | 2/2000 | Fiete et al. |
| 6,130,417 A | 10/2000 | Hashimoto |
| 6,177,952 B1 | 1/2001 | Tabata et al. |
| 6,219,461 B1 * | 4/2001 | Wallack ................ 382/285 |
| 6,229,913 B1 | 5/2001 | Nayar et al. |
| 6,677,948 B1 | 1/2004 | Wasserman et al. |
| 6,683,652 B1 | 1/2004 | Ohkawara et al. |
| 6,829,383 B1 | 12/2004 | Berestov |
| 6,876,776 B2 | 4/2005 | Recht |
| 6,891,966 B2 | 5/2005 | Chen |

(Continued)

FOREIGN PATENT DOCUMENTS

JP          10108152          4/1998

(Continued)

OTHER PUBLICATIONS

Darrell et al., "Pyramid Based Depth from Focus", 1988 p. 504-509.*

(Continued)

*Primary Examiner* — Vu Le
*Assistant Examiner* — Soo Jin Park
(74) *Attorney, Agent, or Firm* — Blakely, Sokoloff, Taylor & Zafman LLP

(57) ABSTRACT

An imaging acquisition system that generates a depth map from two pictures of a three dimensional spatial scene is described. According to one aspect of the invention, the system generates the depth map based on the relative blur between the two pictures and the absolute blur contributed by the system. According to another aspect of the invention, the system calculates the depth map directly from the relative blur between the two pictures.

40 Claims, 16 Drawing Sheets

U.S. PATENT DOCUMENTS

| | | | |
|---|---|---|---|
| 6,925,210 | B2 | 8/2005 | Herf |
| 7,019,780 | B1 | 3/2006 | Takeuchi et al. |
| 7,035,451 | B2 | 4/2006 | Harman et al. |
| 7,303,131 | B2* | 12/2007 | Carlson et al. ............ 235/462.22 |
| 7,340,077 | B2* | 3/2008 | Gokturk et al. ............... 382/103 |
| 2003/0067536 | A1 | 4/2003 | Boulanger et al. |
| 2003/0231792 | A1 | 12/2003 | Zhang et al. |
| 2004/0027450 | A1 | 2/2004 | Yoshino |
| 2004/0036763 | A1 | 2/2004 | Swift et al. |
| 2004/0125228 | A1 | 7/2004 | Dougherty |
| 2004/0131348 | A1 | 7/2004 | Ohba et al. |
| 2005/0104969 | A1 | 5/2005 | Schoelkopf et al. |
| 2005/0105823 | A1* | 5/2005 | Aoki .............................. 382/276 |
| 2005/0220358 | A1 | 10/2005 | Blonde et al. |
| 2005/0265580 | A1 | 12/2005 | Antonucci et al. |
| 2006/0120706 | A1 | 6/2006 | Cho et al. |
| 2006/0221179 | A1 | 10/2006 | Seo et al. |
| 2006/0285832 | A1 | 12/2006 | Huang |
| 2007/0040924 | A1 | 2/2007 | Cho et al. |

FOREIGN PATENT DOCUMENTS

| | | |
|---|---|---|
| JP | 2004048644 | 12/2004 |

OTHER PUBLICATIONS

Ohba, et al., "Real-Time Micro Environmental Observation with Virtual Reality", 2000, International Conference on Pattern Recognition, vol. 4, pp. 487-490.

Ohba, et al., "Microscopic Vision System with All-in-focus and Depth Images", Dec. 2003, Machine Vision and Applications, vol. 15, Issue 2, pp. 55-62.

Pettersson, Niklas, "Online Stereo Calibration using FPGAs", http://nice.se/publications/pettersson_thesis_2005.pdf, 2005, pp. 1-6.

Ghita, Ovidiu and Whelan, Paul, "Real-Time 3D Estimation Using Depth from Defocus", www.vsq.dcu.ie/papers/vision_2000.pdf, 2000, Third Quarter, vol. 16, No. 3, pp. 1-6.

Darrell, et al., "Pyramid Based Depth From Focus", 1988, pp. 504-509.

Blickgesteuerte PC-Steuerung,Forschung&Entwicklung, XP-000725834, Publiation Date Aug. 4, 1997, pp. 76-78.

21st Century 3D: 3DVX3 Press Release; 21st Century 3D Introduces Uncompressed 4:4:4 Steroscopic camera System-3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postscript); Reads History; Translate Abstract; Title: Three-dimensional Camera Phone, Authors: Iizuka, Kiego, Publications: Applied Optics IP, vol. 43, pp. 6285-6292, Publication Date: Dec. 2004, Origin: Web, Bibliographic Code: 2004ApOpt..43. 6285I.

Real-time view interpolation system for a super multiview 3D display; processing; Smithsonian/NASA ADS Physics Abstract Service; find Similar Abstracts (wtih default settings below); Table of Contents; Also-Read Articles (Reads History); Translate Abstract; Title: Real-Time view interpolastion system for a super multiview 3D display; processsing implementation and evalutaion; Authors: Hamaguchi, Tadahiko, Fujii, Toshiaki; Honda, Toshio; Affiliation: AA (Telecommunications Advancement Organization of Japan) AB (Telecommunications Advancement Organization of Japan and Nagoya Univ.) AC (Telecommunications Advancement Organization of Japan and Chiba Univer.); Publication; Proc. SPIE vol. 4660, p. 105-115, Steroscopic Displays and Virtual Reality Systems, IX, Andrew J. Woods; John O. Merritt; Stephen A. Benton; Mark T. Bolas; Eds. (Spie Homepage); Publication Date: May 2002; Origin: SPIE; Abstract Copyright: 2002 SPIE-The Internantion Society for Optical Engineering, Downloading of the abstract is permitted for personal use only; Bibliographic Code: 2002SPIE.4600..105H.

3D displays; Using cellphane to convert a liquid crystal display screen into a three dimensional display (3D laptop computer and 3D Camera phone); Keigo Iizuka; Department of Electrical & Computer Engineering, 35 St. George Stree, University of Toronto, Toronto, Ontario, Canada M5S 1A4, available online since Aug. 2003.

Eugene Hecht, Optics 3rd Edition, Addison-Wesley, The Propagation of Light, Chapter 4, p. 126.

Klaus Berthold, Paul Horn, "Robot Vision", 1986, pp. 1-509.

Tony Lindeberg, "Scale-Space Theory: A Basic Tool for Analysing Structures At Different Scales", Journal of Applied Statistics, vol. 21, No. 2, pp. 225-270, 1994.

Alex Paul Pentland, "A New Sense for Depth of Field", 1987, pp. 1-15, IEEE.

Shang-Hong Lai, Chang-Wu Fu and Shyang Chang, "A Generalized Depth Estimation Algorithm with a Single Image", 1992, pp. 405-411, IEEE.

John Ens and Peter Lawrence, "An Investigation of Methods for Determining Depth from Focus", 1993, pp. 97-108, IEEE.

Gopal Surya and Murali Subbarao, "Depth from Defocus by Changing Camera Aperture: A Spatial Domain Approach", 1993, pp. 61-67, IEEE.

Mats Gokstorp, "Computing depth from out-of-focus blur using a local frequency representation", 1994, pp. 153-158, IEEE.

Gunther Schneider, Bernard Heit, Johannes Honig, and Jacques Brémont, "Monocular Depth Perception by Evaluation of the Blur in Defocused Images", 1994, pp. 116-119, IEEE.

Murali Subbarao, Tse-Chung Wei, and Gopal Surya, "Focused Image Recovery from Two Defocused Images Recorded with Different Camera Settings", 1995, pp. 1613-1628, IEEE.

Shree K. Nayar, Masahiro Watanabe and Minori Noguchi, Real-Time Focus Range Sensor, 1996, pp. 1186-1198.

Masahiro Watanabe and Shree K. Nayar, "Minimal Operator Set for Passive Depth from Defocus", 1996, pp. 431-438, IEEE.

Johannes Honig, Bernard Heit and Jacques Bremont, "Visual Depth Perception Based on Optical Blur", 1996, pp. 721-724, IEEE.

A.N. Rajagopalan and S. Chaudhuri, "A Variational Approach to Recovering Depth From Defocused Images", 1997, pp. 1158-1164, IEEE.

D. Ziou, S. Wang and J. Vaillancourt, "Depth from Defocus Using the Hermite Transform", 1998, pp. 958-962, IEEE.

Shinsaku Hiura and Takashi Matsuyama, Depth Measurement by the Multi-Focus Camera, 7 pgs., Department of Science and Technology, Japan, 1998.

Christophe Simon and Frederique Bicking, "Estimation of depth on thick edges from sharp and blurred images", 2002, pp. 323-328, IEEE.

Ovidiu Ghita, Paul F. Whelan and John Mallon, "Computational approach for depth from defocus", Apr.-Jun. 2005 pp. 023021-1-023021-8, vol. 14(2), Journal of Electronic Imaging.

Tony Lindeberg, "On the axiomatic foundations of linear scale-space: Combining semi-group structure with causality vs. scale invariance", pp. 1-24, 1994, Computational Vision and Action Perception Laboratory (CVAP), Klumer Academic,Sweden.

B.P. Horn, "Robot Vision", 1986, pp. 18-28, MIT Press, New York,McGraw-Hill.

Yalin Xiong, Steven A. Shafer, "Depth from Focusing and Defocusing", 1993, pp. 68-73, IEEE, Pittsburgh, PA.

Kang-Sun Choi, Jun-Suk Lee and Sung-Jae Ko, "New AutoFocusing Technique Using the Frequency Selective Weighted Median Filter for Video Cameras", Jun. 28, 1999, pp. 820-827, IEEE, Korea University, Korea.

L. Firestone, K. Cook, K. Culp, N. Talsania, K. Preston Jr., "Comparison of autofocus methods for automated microscopy" Mar. 13, 2006, pp. 195-206, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera", May 2003, pp. 257-262, Consumer Electronics, IEEE Transactions.

* cited by examiner

DEPTH INFORMATION FOR AUTO FOCUS USING TWO PICTURES AND TWO-DIMENSIONAL GAUSSIAN SCALE SPACE THEORY

RELATED APPLICATIONS

This patent application is related to the co-pending U.S. Patent Application, entitled A NEW METHOD FOR CREATING A DEPTH MAP FOR AUTO FOCUS USING AN ALL IN FOCUS PICTURE AND 2D SCALE SPACE MATCHING, Ser. No. 11/185,611.

FIELD OF THE INVENTION

This invention relates generally to imaging, and more particularly to generating a depth map from multiple images.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Sony Electronics, Incorporated, All Rights Reserved.

BACKGROUND OF THE INVENTION

A depth map is a map of the distance from objects contained in a three dimensional spatial scene to a camera lens acquiring an image of the spatial scene. Determining the distance between objects in a three dimensional spatial scene is an important problem in, but not limited to, auto-focusing digital and video cameras, computer/robotic vision and surveillance.

There are typically two types of methods for determining a depth map: active and passive. An active system controls the illumination of target objects, whereas an passive system depend on the ambient illumination. Passive systems typically use either (i) shape analysis, (ii) multiple view (e.g. stereo) analysis or (iii) depth of field/optical analysis. Depth of field analysis cameras rely of the fact that depth information is obtained from focal gradients. At each focal setting of a camera lens, some objects of the spatial scene are in focus and some are not. Changing the focal setting brings some objects into focus while taking other objects out of focus. The change in focus for the objects of the scene at different focal points is a focal gradient. A limited depth of field inherent in most camera systems causes the focal gradient.

In one embodiment, measuring the focal gradient to compute a depth map determines the depth from a point in the scene to the camera lens as follows:

$$d_o = \frac{fD}{D - f - 2krf_{number}} \quad (1)$$

where f is the camera lens focal length, D the distance between the image plane inside the camera and the lens, r is the blur radius of the image on the image plane, k is a scale factor, and $f_{number}$ is the $f_{number}$ of the camera lens. The $f_{number}$ is equal to the camera lens focal length divided by the lens aperture. Except for the blur radius, all the parameters on the right hand side of Equation 1 are known when the image is captured. Thus, the distance from the point in the scene to the camera lens is calculated by estimating the blur radius of the point in the image.

Capturing two images of the same scene using different apertures for each image is a way to calculate the change in blur radius. Changing aperture between the two images causes the focal gradient. The blur radius for a point in the scene is calculated by calculating the Fourier transforms of the matching image portions and assuming the blur radius is zero for one of the captured images.

SUMMARY OF THE INVENTION

An imaging acquisition system that generates a depth map from two pictures of a three dimensional spatial scene is described. According to one aspect of the invention, the system generates the depth map based on the relative blur between the two pictures and the absolute blur contributed by the system. According to another aspect of the invention, the system calculates the depth map directly from the relative blur between the two pictures.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
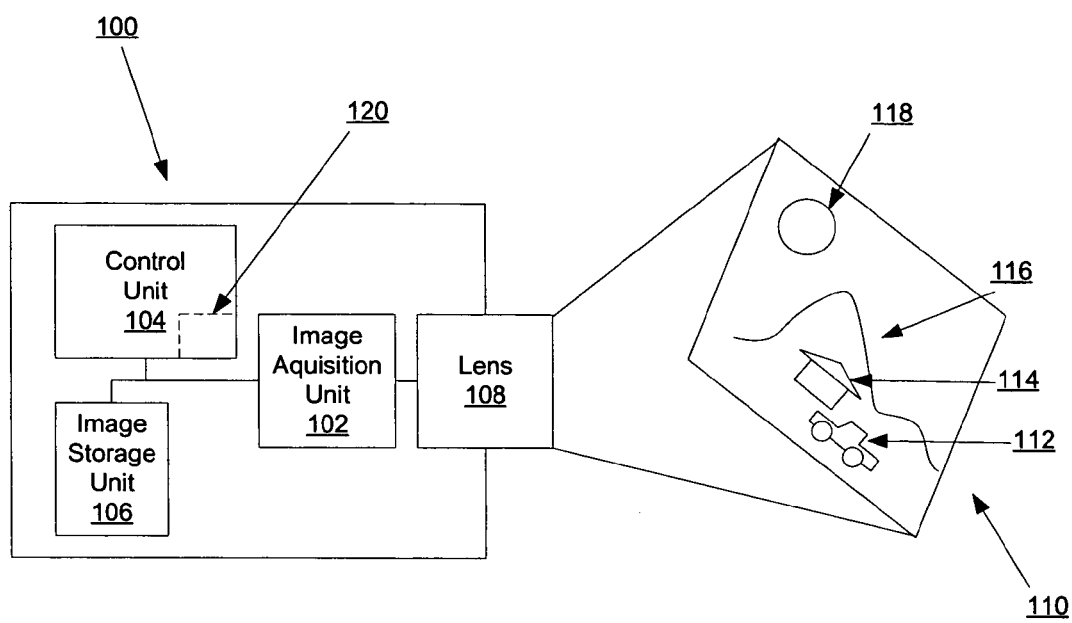
FIG. 1 illustrates one embodiment of an imaging system.

FIG. 1 illustrates one embodiment of an imaging unit 100 that captures an image of a three dimensional spatial scene 110. References to an image or a picture refer to an image of a three dimensional scene captured by imaging system 100. Imaging unit 100 comprises an image acquisition unit 102, a control unit 104, an image storage unit 106, and lens 108. Imaging unit 100 may be, but is not limited to, digital or film still camera, video camera, surveillance camera, robotic vision sensor, image sensor, etc. Image acquisition unit 102 captures an image of scene 110 through lens 108. Image acquisition unit 102 can acquire a still picture, such as in a digital or film still camera, or acquire a continuous picture, such as a video or surveillance camera. Control unit 104 typically manages the image acquisition unit 102 automatically and/or by operator input. Control unit 104 configures operating parameters of the image acquisition unit 102 and lens 108 such as, but not limited to, the lens focal length, f, the aperture of the lens, A, lens focus, and (in still cameras) the lens shutter speed. In addition, control unit 104 may incorporate a depth map unit 120 (shown in phantom) that generates a depth map of the scene. The image(s) acquired by image acquisition unit 102 are stored in the image storage 106.

In FIG. 1, imaging system 100, records an image of scene 110. While in one embodiment scene 110 is composed of four objects: a car 112, a house 114, a mountain backdrop 116 and a sun 118, other embodiments of scene 110 may be composed of several hundred objects with very subtle features. As is typical in most three dimensional scenes recorded by the lens of the imaging system 100, objects 112-118 in scene 110 are at different distances to lens 108. For example, in scene 110, car 112 is closest to lens 108, followed by house 114, mountain backdrop 116 and sun 118. Because of the limited depth of field inherent in imaging acquisition unit 102, a focal setting of lens 108 will typically have some objects of scene 110 in focus while others will be out of focus. Although references to objects in an image, portions of an image or image block do not necessarily reflect the same specific subdivision of an image, these concepts all refer to a type of image subdivision.

Figure 2:
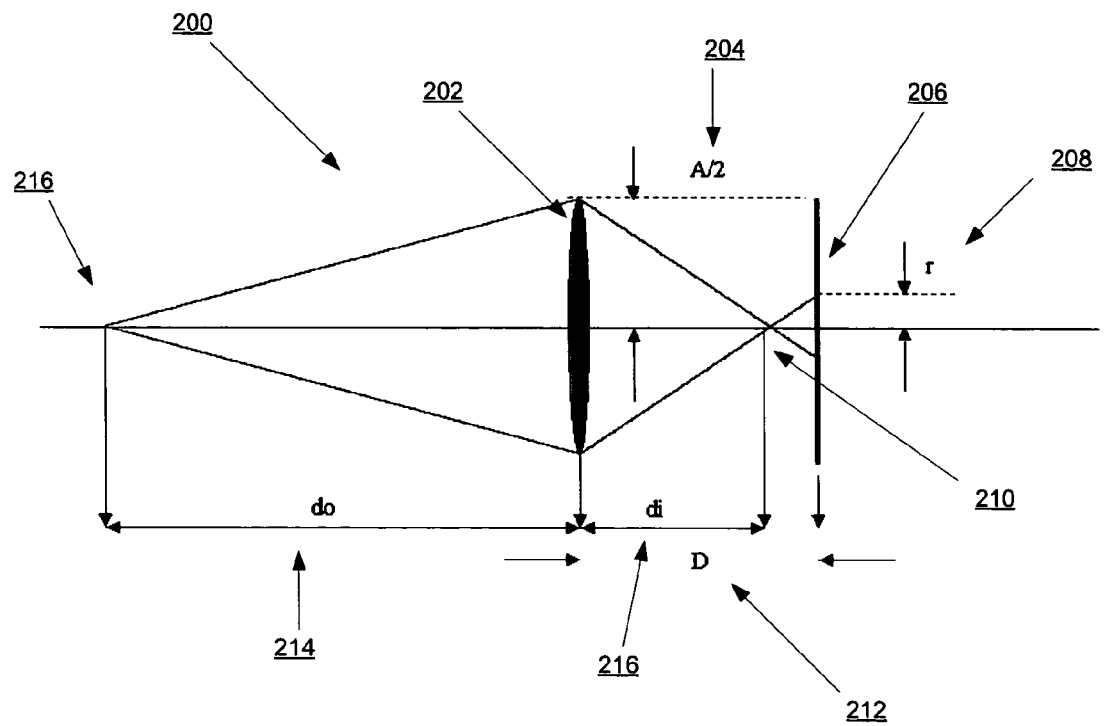
FIG. 2 illustrates one embodiment of an imaging optics model.

FIG. 2 illustrates one embodiment of an imaging optics model 200 used to represent lens 202. The optics model 200 represents lens 202 focusing on the point 216 resulting in an image 210 displayed on the image plane. Lens 202 has aperture A. The radius of the aperture (also known as the lens radius) is shown in 204 as A/2. By focusing lens 202 on point 216, image 210 is displayed on image plane 206 as a point as well. On the other hand, if lens 202 is not properly focused on the point 216, image 210 is displayed on the image plane 206 as a blurred image 208 with a blur radius r. Distance $d_i$ 216 is the distance between image 210 and lens 202 and distance $d_o$ 214 is the distance between point 216 and lens 202. Finally, D 216 is the distance between lens 202 and image plane 206.

Figure 3:
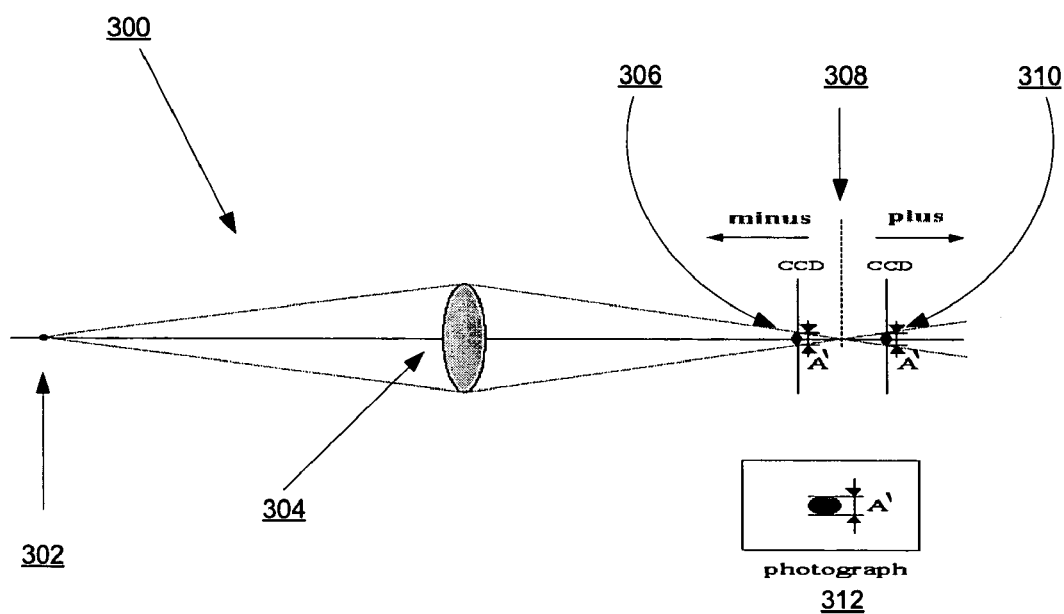
FIG. 3 illustrates one embodiment of an imaging optics model exhibiting front and back blur ambiguity.

FIG. 3 illustrates one embodiment of an imaging optics model 300 exhibiting front and back blur ambiguity. In FIG. 3, optics model 300 represents lens 304 focusing on point 302 resulting in a focused image 308. If lens 304 is not properly focus on point 302, the resulting image 308 is out of focus. If lens 304 focuses too close by an amount x in the minus direction, to point 302, the resulting image is blurred image 306 with blur diameter A'. Blur diameter A' is twice as large as the corresponding blur radius r. On the other hand, if lens focuses too far from point 302 by x in the plus direction, the resulting image is blurred image 310 with blur diameter A'. A top image of images 306 and 310 is image 312. Thus, focusing lens 304 on point 302 too close or too far by an equivalent amount results in the same blurred image 312. Because of the front/back ambiguity, an observer viewing image 312 cannot determine whether lens 304 focused too close or too far.

Figure 4:
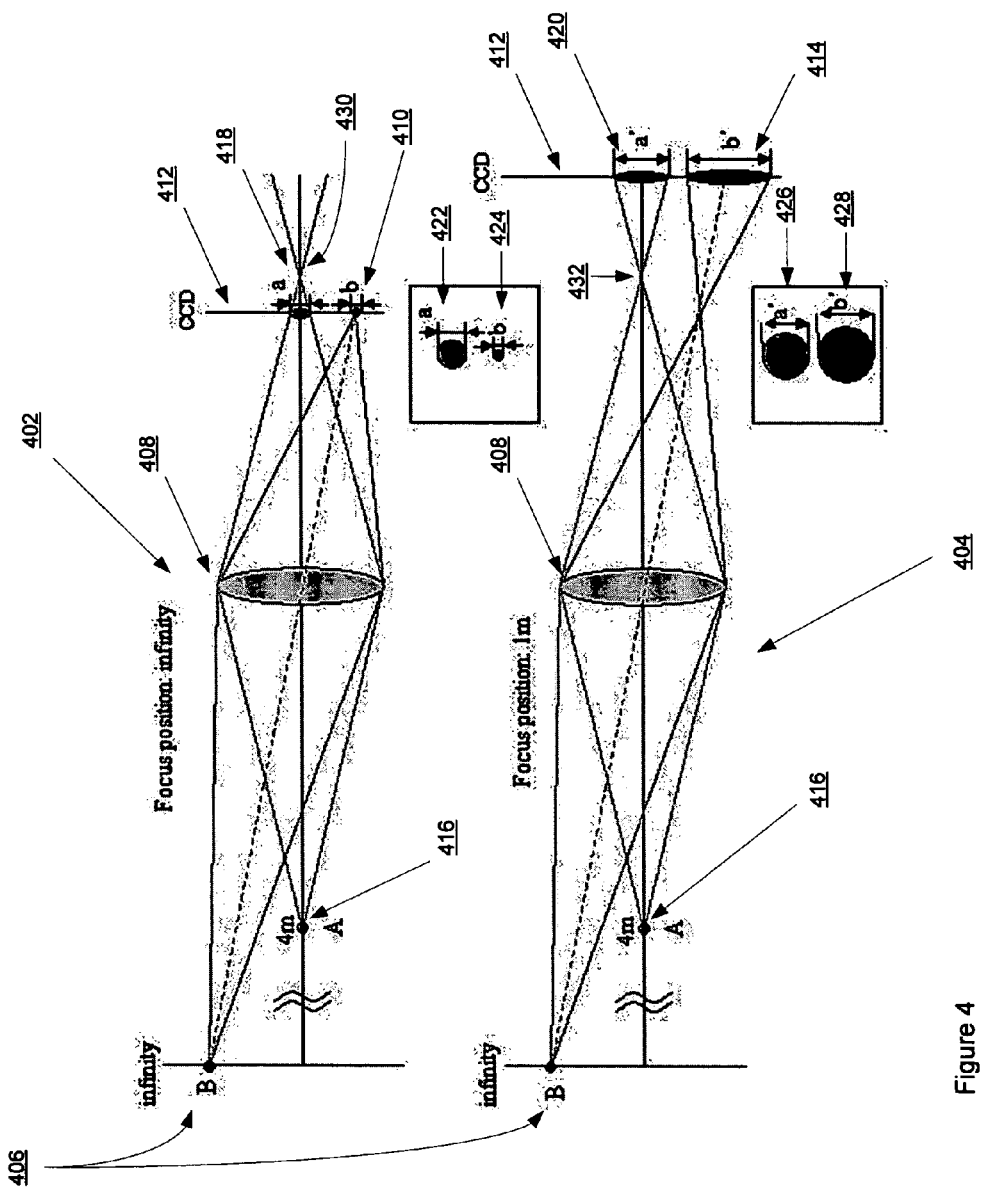
FIG. 4 illustrates one embodiment of an imaging optics model used to estimate the depth map by taking two pictures with different focal points.

FIG. 4 illustrates one embodiment of two imaging optics settings used to estimate the depth map by taking two pictures with different focal positions. In FIG. 4, imaging acquisition unit 102 uses optics setting 402 to capture a first picture of point 416 through lens 408 with an infinite focus position (i.e. lens 408 is focusing on the most distant objects possible). In FIG. 4 and by way of illustration, point 416 is four meters distant from lens 408. The resulting image 418 on image plane 412 has a blur diameter a. A top view of image 418 is shown with image 422. With optics setting 402, a properly focused image 430 of point 416 is to the right of (or, equivalently, behind) image plane 412.

Imaging acquisition unit 102 captures the second picture with optics setting 404. Optics setting 404 differs from optics setting 402 because lens 408 focuses at one meter, not at infinity. Consequently, the resulting image of point 416 is a blurred image 420 with a blur diameter, a', on image plane 412. By focusing lens 408 at one meter, the properly focused image of point 416 is to the left (or, equivalently, in front) of image plane 412. Because the proper image focusing point has switched from the back to the front of image plane 412, a scheme using the blur diameters, a and a', can take advantage of the front/back blur ambiguity. The relative blur difference and front/back blur ambiguity is used to calculate a depth map of the pictures as further described in FIG. 5 below.

Furthermore, FIG. 4 illustrates using optics setting 402 and 404 to capture pictures of test point 406 at focus position infinity and one meter. With optics setting 402, the resulting image 410 of test point 406 is a point with no blur diameter (i.e. b=0), because lens 408 is properly focused on test point 406. A top view of image 410 is shown as image 424. In contrast, optics setting 404 focuses lens 408 at one meter on test point 406, which results in image 414 with blur diameter b' on image plane 412. Because there is no blur diameter for image 410, blur diameter b' is the absolute blur inherent in imaging acquisition unit 102. Determining the absolute blur is further described in FIG. 6 below.

Figure 5:
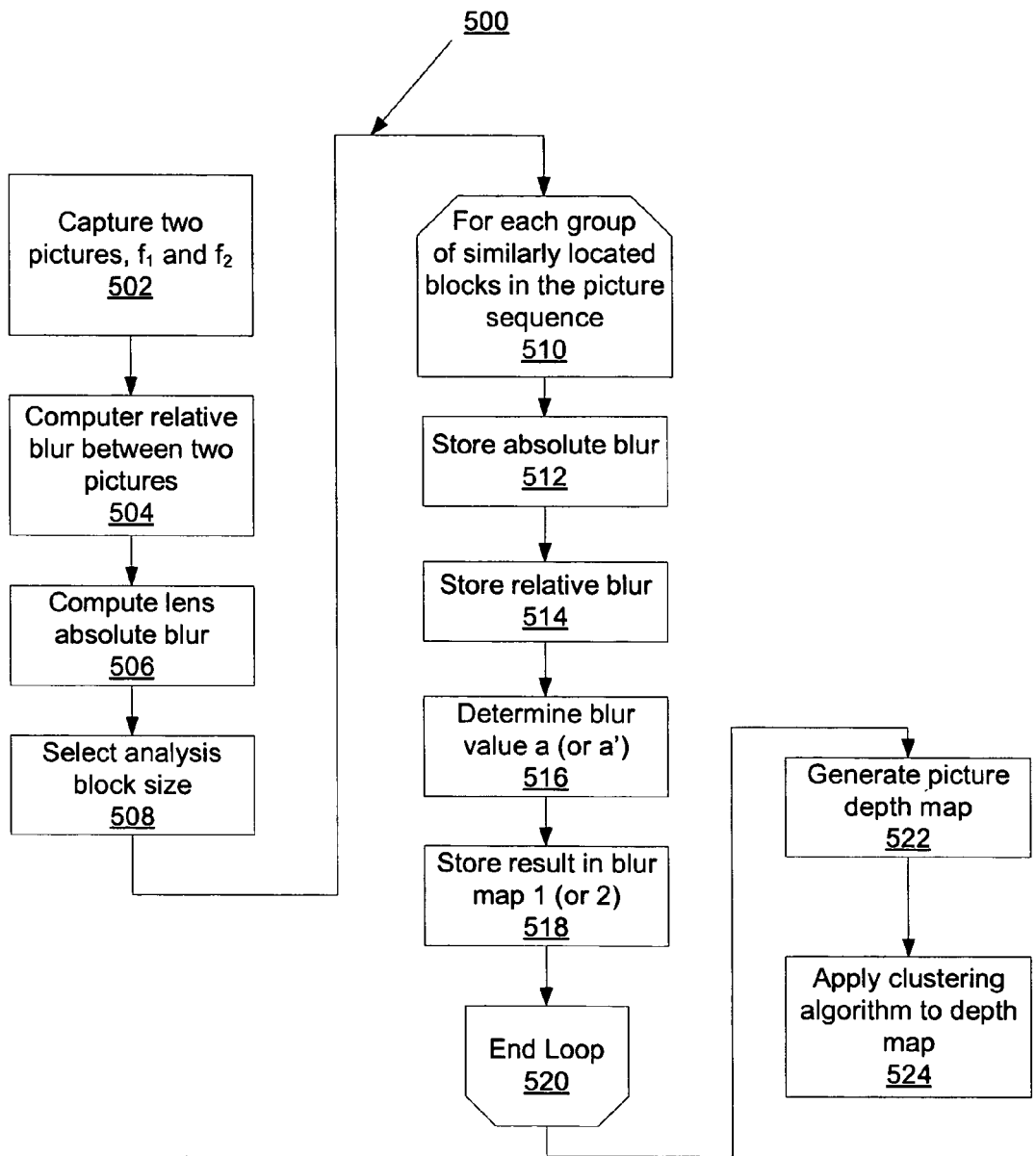
FIG. 5 is a flow chart of one embodiment of a method for generating a picture depth map by computing the absolute and relative blur difference between two pictures.

FIG. 5 is a flow chart of one embodiment of a method 500 for generating a picture depth map by computing the absolute and relative blur difference between two pictures. In FIG. 5, at block 502, method 500 causes imaging acquisition unit 102 to capture two pictures using the optics settings illustrated in FIG. 4. Referring back to FIG. 4, imaging acquisition unit 102 captures the first picture, $f_1$, with optics setting 402 with an infinite focal setting. The second picture, $f_2$, captured by imaging acquisition unit 102 uses optics setting 404 with the focal position of one meter. Returning to FIG. 5, at block 504, method 500 estimates the relative blur between the two captured pictures by convolving sharper parts of one picture into the blurred parts of the other picture. Relative blur estimation is further described in FIG. 6, below.

Returning to FIG. 5, at block 506, method 500 computes the absolute blur contributed by the imaging acquisition unit 102. Each lens contributes an inherent blur. Method 500 measures the inherent blur by taking two pictures of a test pattern at different optics settings. Measuring the lens absolute blur is further described in FIG. 10 below. Alternatively, the lens absolute blur can be computing using Equation 8.

Returning to FIG. 5, at block 508, method 500 looks up and stores the absolute blur for the camera settings used to capture the two pictures. At block 508, method 500 selects an analysis block size. In one embodiment, the analysis block size is square block of k×k pixels. While in one embodiment, a block size of 16×16 or 32×32 pixels is used, alternative embodiments may use a smaller or larger block size. The choice of block size should be small enough to sufficiently distinguish the different picture objects in the captured picture. However, the block should be large enough to be able to capture adequate picture detail to ensure computational accuracy. Alternatively, other shapes and sizes can be used for analysis block size (e.g., rectangular blocks, blocks within objects defined by image edges, etc.).

Method 500 further executes a processing loop (blocks 510-520) to construct a blur map from the absolute and relative blur. At block 512, method 500 stores the absolute blur difference for a picture block. At block 514, method 500 stores the relative blur difference for a picture block. At block 516, method 500 determines the blur for the picture block by solving the following two equations with two unknowns:

$$\text{Blur}_{absolute} = a - a' \qquad (2)$$

$$\text{Blur}_{relative} = |a| - |a'| \qquad (3)$$

where $\text{Blur}_{absolute}$ is the absolute blur inherent in the lens imaging configuration (b' as shown in FIG. 4 above), $\text{Blur}_{relative}$ is the relative blur determined at block 504. In one embodiment, a is the blur diameter of $f_1$ and is positive and a' is the blur diameter of $f_2$ and is negative. The two blur diameters a and a' have opposite signs because the properly focused images from optics setting 402 and 404 used to capture $f_1$ and $f_2$ are in back and in front of the image plane, respectively. In one embodiment, method 500 determines the blur diameter, a, for the picture block by solving Equation 2 or 3 for a. Alternatively, method 500 determines blur diameter a' by solving Equation 2 or 3 for a'. Since a' is negative, method 500 uses the absolute value of a'. At block 516, method 500 determines the blur radius r from a (or a'), stores the blur radius r at block 518 in the appropriate location of the blur map. Thus, method 500 can equivalently build a blur map for $f_1$ or $f_2$.

Returning to FIG. 5, at block 522, method 500 generates a picture depth map from the blur map using the geometric optics model. As explained above, the geometric optics model relates the distance of an object in a picture to a blurring of that object. Method 500 calculates a distance from the associated blur radius value contained in the blur map using Equation 1. Because the lens focal length, f, distance between the camera lens 202 and image plane 206, D, and $f_{number}$ are constant at the time of acquiring the finite depth of field picture, method 500 computes the distance value of the depth map from the associated blur radius using the blur map. Method 500 uses the constants in Equation 1 that are consistent with the value stored in blur map.

At block 524, method applies a clustering algorithm to the depth map. The clustering algorithm is used to extract regions containing similar depths and to isolate regions corresponding to outliers and singularities. Clustering algorithms are well-known in the art. For example, in one embodiment, method 500 applies nearest neighbor clustering to the picture depth map.

Figure 6:
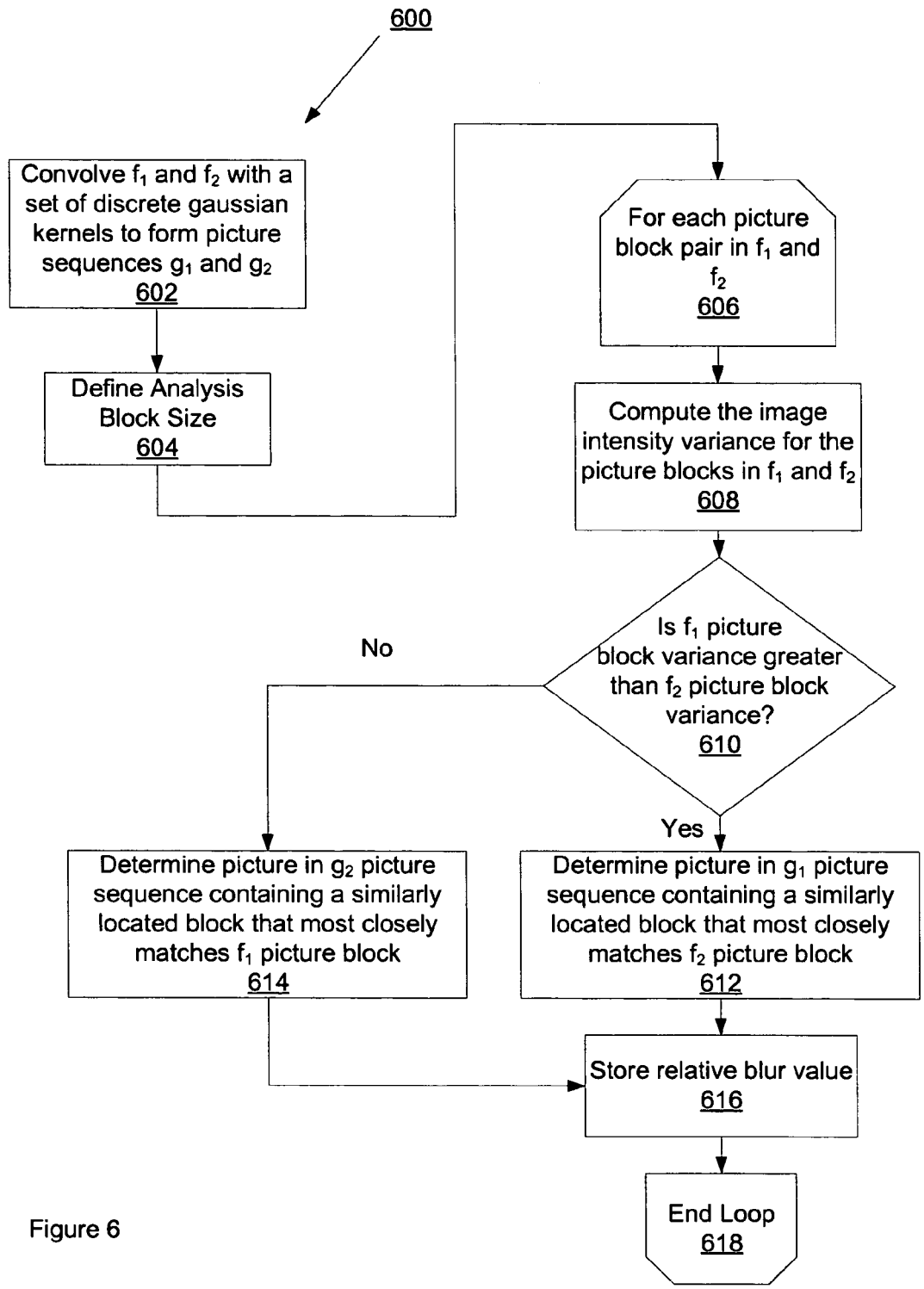
FIG. 6 is a flow chart of one embodiment of a method that calculates a relative blur difference between two pictures.

FIG. 6 illustrates a flow chart of a method that calculates a relative blur difference between two captured pictures. At FIG. 6, at block 602, method 600 receives the captured pictures, $f_1$ and $f_2$ and convolves each captured picture with a set of discrete gaussian kernels to form picture sequences $g_1$ and $g_2$. The set of discrete gaussian kernels applies varying amounts of blur to the captured pictures. Each gaussian kernel applies a uniform amount of blur to each object in scene 110, such that each portion of the resulting picture is equally blurred. Thus, the resulting picture sequences, $g_1$ and $g_2$, is a sequence of uniformly blurred pictures; each subsequent picture in the sequences is a progressively blurrier representation of the original captured picture.

Figure 7:
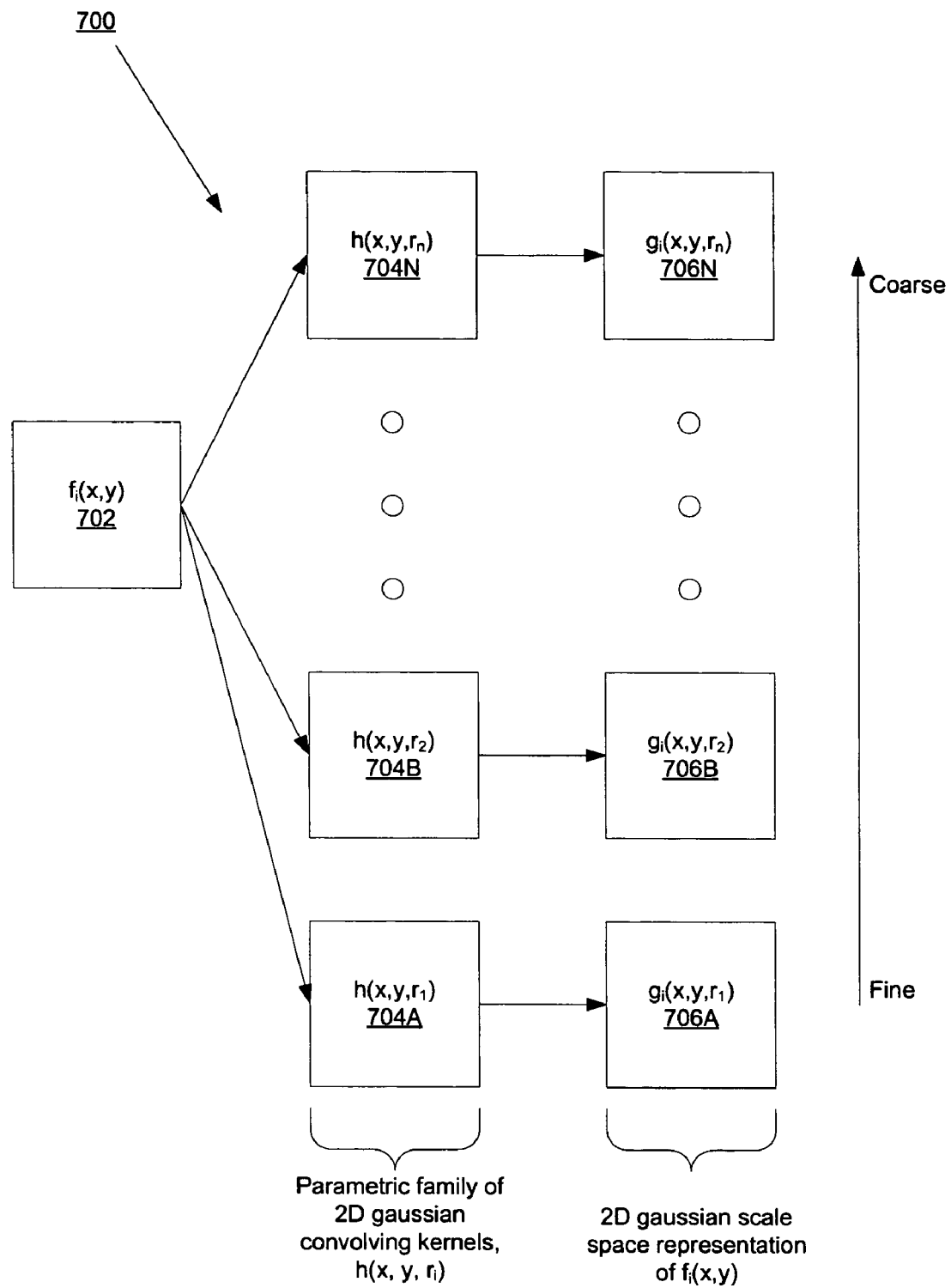
FIG. 7 illustrates one embodiment of generating a two-dimensional (2D) scale space representation of the captured pictures using a family of convolving gaussian kernels.

FIG. 7 illustrates one embodiment of generating a 2D scale space representation of pictures $f_1$ and $f_2$ using a family of convolving kernels as performed by method 600 at block 602. Specifically, FIG. 7 illustrates method 700 applying a parametric family of convolving gaussian kernels ($h(x, y, r_i)$, i=1, 2, ... n) 704A-N is applied to one of the two pictures $f_j(x,y)$ 702 as follows:

$$g_j(x,y,r_i) = f_j(x,y) * h(x,y,r_i) \qquad (4)$$

where j=1, 2 and $r_i$ is the blur explicit to $f_j(x,y)$.

The resulting picture sequence, $g(x, y, r_i)$ 706A-N, represents a progressive blurring of the captured picture $f_j(x, y)$. As i increases, the convolving kernel applies a stronger blur to the captured picture, thus giving a blurrier picture. The blurred pictures sequence 706A-N is the 2D scale space representation off $f_j(x,y)$. The exemplary embodiment uses gaussian kernels because the blur difference is easily measurable due to the semi-group property of gaussian kernels. Alternatively, any other convolving kernels known in the art having a semi-group property is suitable to generate a 2D scale space representation of the capture pictures. Kernels that do not have the semi-group property, such as pillbox kernels, cannot provide an exact solution using method 600.

Returning to FIG. 6, at block 604, method 600 selects an analysis block size. In one embodiment, the analysis block size is square block of k×k pixels. While in one embodiment, a block size of 16×16 or 32×32 pixels is used; alternative embodiments may use a smaller or larger block size. The choice of block size should be small enough to sufficiently distinguish the different picture objects in the captured picture. However, the block should be large enough to be able to capture adequate picture detail for computational accuracy. Alternatively, other shapes and sizes can be used for analysis block size (e.g., rectangular blocks, blocks within objects defined by image edges, etc.). In one embodiment, method 600 uses the same block size used by method 500 at block 508. In an alternate embodiment, method 600 uses another block size.

Method 600 further executes a processing loop (606-620) to determine the relative blur between each set of picture blocks from the two captured pictures. At block 608, method 600 computes the image intensity variance for each picture block in the set of picture blocks. For a given picture or scene, a sharp picture has a larger variance in pixel intensities than a blurred picture because the sharp picture has strong contrast of intensity giving high pixel intensity variance. On the other hand a blurred picture has intensities that are washed together with weaker contrasts, resulting in a low pixel intensity variance. Alternative embodiments use different sharpness metrics, including, but not limited to, computing the two dimensional FFT of the data and choosing the block with the maximum high frequency energy in the power spectrum, applying the Tenengrad metric, finding the block with the maximum sum modulus difference, etc.

Figure 8:
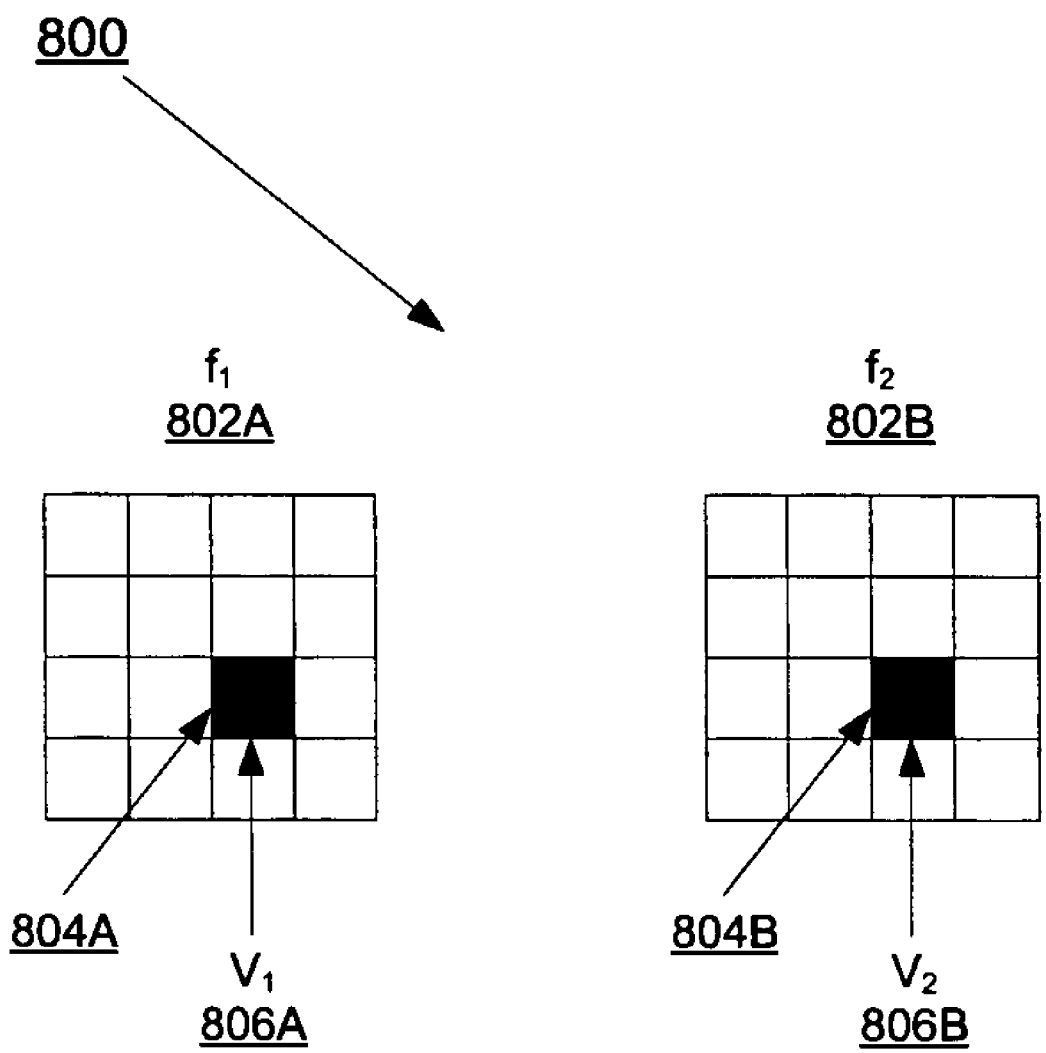
FIG. 8 illustrates one embodiment of determining the variance for a set of corresponding picture blocks in two different pictures.

FIG. 8 illustrates one embodiment of the set of corresponding picture blocks used by method 600. In FIG. 8, picture blocks 804A-B have intensity variance $V_1$ 806A and $V_2$ 806B, respectively. Furthermore, picture blocks 804A-B are part of the captured pictures $f_1$ and $f_2$. Method 600 uses variances $V_1$ 806A and $V_2$ 806B for the variance comparison.

Returning to FIG. 6, at block 610, method 600 determines if the intensity variance for the picture block in picture $f_1$ is larger than the intensity variance for the corresponding picture block in picture $f_2$. If so, at block 612, method 600 determines the corresponding picture block in picture sequence $g_1$ that best matches the picture block from $f_2$. Method 600 determines the blur difference between the two picture blocks by convolving the sharper picture block into the blurrier picture block. Because the variance of the $f_1$ picture block is larger than the $f_2$ picture block, the $f_1$ picture block is sharper than the $f_2$ picture block. In this case, because the $f_1$ picture block is sharper than the $f_2$ picture block, method 600 uses the $g_1$ picture sequence as this represents convolving the sharper $f_1$ picture blocks into blurrier picture $f_2$ blocks. By convolving sharper picture blocks into blurred picture blocks, method 600 estimates the blur difference between the two picture blocks of $f_1$ and $f_2$.

Figure 9:
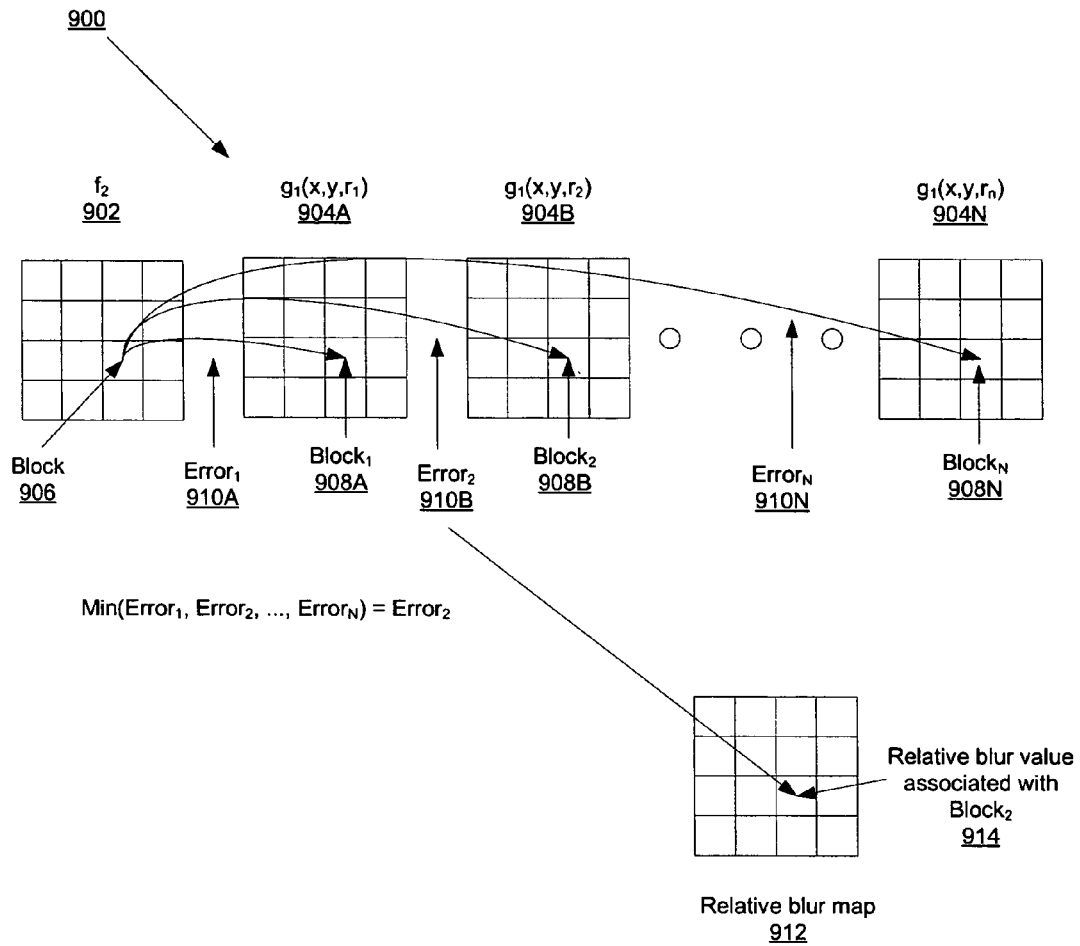
FIG. 9 illustrates one embodiment of using the scale space representation to find a block for the relative blur map.

FIG. 9 illustrates one embodiment of using the scale space representation to find a block for the relative blur map. Specifically, FIG. 9 illustrates the process that method 600 uses to determine the closest match between block 906 of picture $f_2$ 902 with one of the corresponding picture blocks 908A-N of $g_1$ picture sequence 904A-N. As described above, $g_1$ picture sequence 904A-N is a sequence of progressively blurrier pictures of $f_1$. Method 600 selects the closest matching picture block by minimizing the error 910A-N between block 906 and each of blocks 908A-N. The error between pairs of picture blocks is estimated as follows:

$$Error_l = \sum_{i,=x,j=y}^{i=x+s-1,j=y+s-1} |f_2(i, j) - g_1(i, j, r_l)| \quad (5)$$

where $f_2(i, j)$ and $g_1(i,j,r_1)$ are the pixel intensities of the pictures $f_2$ and $g_1$ at pixel i, j and l=1, 2, ..., N (with N being the number of pictures in the picture sequence). $r_l$ denotes the parametric family of increasing blur kernels. In one embodiment, $r_l$ denotes the parametric family of increasing gaussian blur kernels. The error measures the difference between the picture block of $f_2$ and a similarly located picture block from one picture in the $g_1$ picture sequence. Alternatively, other metrics known in the art measuring image differences could be used as an error metric (e.g., instead of the 1 norm shown above, the 2 norm (squared error norm), or more generally, the p norm for p>=1 can be used, etc.). In the example illustrated in FIG. 9, $block_2$ 908B is the closest match to block 906, because $Error_2$ 910B is the smallest error in the set of error values 910A-N.

Returning to FIG. 6, if the $f_2$ picture block is sharper, method 600 determines the corresponding picture block in picture sequence $g_2$ that best matches the picture block from $f_1$ at block 614. As in block 612, method 600 determines the closest matching picture block from by determining the picture block with the smallest error. At block 614, method 600 determines each error value as follows:

$$Error_l = \sum_{i,=x,j=y}^{i=x+s-1,j=y+s-1} |f_1(i, j) - g_2(i, j, r_l)| \quad (6)$$

At block 616, method 600 stores the blur difference value from the corresponding picture block in the relative blur map. Referring to the example illustrated in FIG. 9, method 600 copies the blur difference value associated with $block_2$ 908B to the relative blur map entry 914 in the relative blur map 912.

Figure 10:
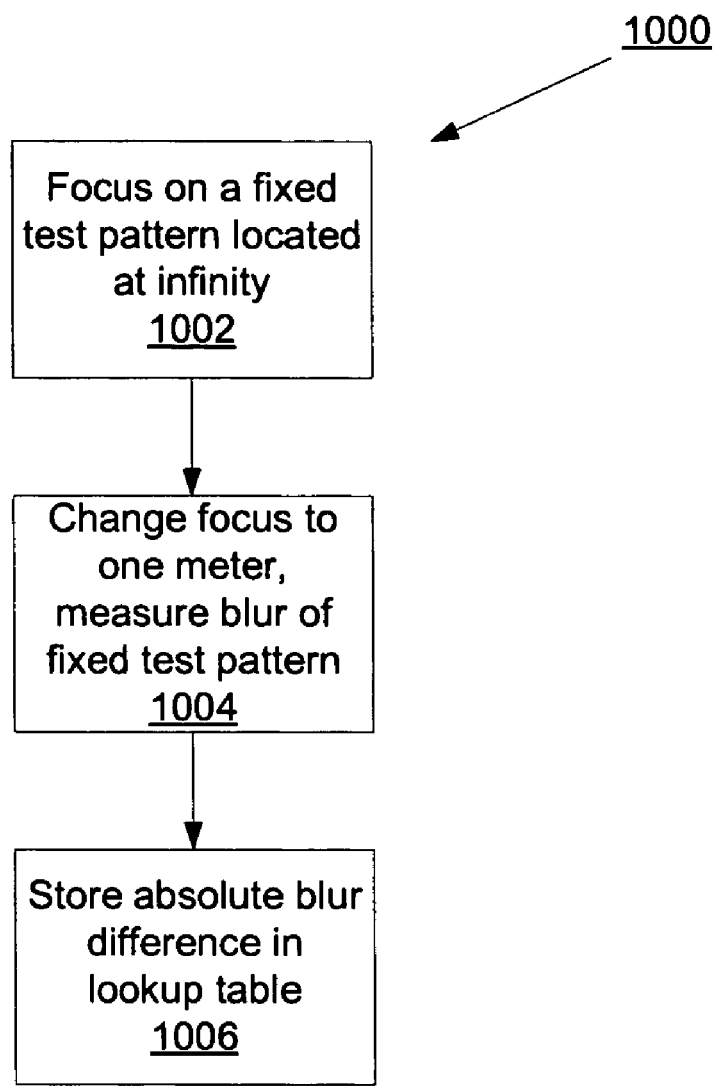
FIG. 10 is a flow chart of one embodiment of a method for measuring and recording the absolute blur contributed by lens 108.

FIG. 10 is a flow chart of one embodiment of a method 1000 that measures and records the absolute blur contributed by lens 108 as illustrated in FIG. 1. Method 1000 executes processing loop (blocks 1002-1006) to store the absolute blur values for each combination of aperture and focal lengths in a lookup table. At block 1004, method 1000 causes lens 108 to focus on a fixed test pattern located at infinity with a unique combination of aperture and focal length settings. Referring to FIG. 4, method 1000 uses optics settings 402. Returning back to FIG. 10, at block 1006, method 1000 causes the lens to change the focus to one meter using the same aperture and focal length. Changing the focus from infinity to one meter causes a blurring of an image of the fixed test pattern. At block 1006, method 1000 records the blur values, in pixels. Referring to FIG. 4, method 1000 uses optics setting 404 to measure the blur diameter b'. Alternatively, at block 1006, method 1000 computes the absolute blur analytically, in physical dimensions (not pixels), based on Equation 1 and the imaging optics model shown in FIG. 2. Instead of solving for $d_0$ as shown in Equation 1, method 1000 uses Equations 7 and 8, a rewritten version of Equation 1 that solves for the absolute blur, kr:

$$kr = \frac{D - f - \frac{fD}{d_0}}{2f_{num}} \quad (7)$$

Now, if $d_0=\infty$, the Equation 7 simplifies to:

$$kr = \frac{D - f}{2f_{num}} \quad (8)$$

By setting D to the maximum value allowed by the camera for focus at infinity, method 1000 computes kr in a physical dimension in physical units, such as micrometers. Conversion between pixels and physical dimensions is straightforward based on the pixel size. For example and by way of illustration, if the blur radius (in pixels) is computed as 3 pixels and the pixel size is 5 μm×5 μm, the blur radius in physical dimensions is 15 μm. Regardless of the embodiment used to determine the absolute blur difference, at block 1006, method 1000 stores the absolute blur difference in pixels in a lookup table.

Figure 11:
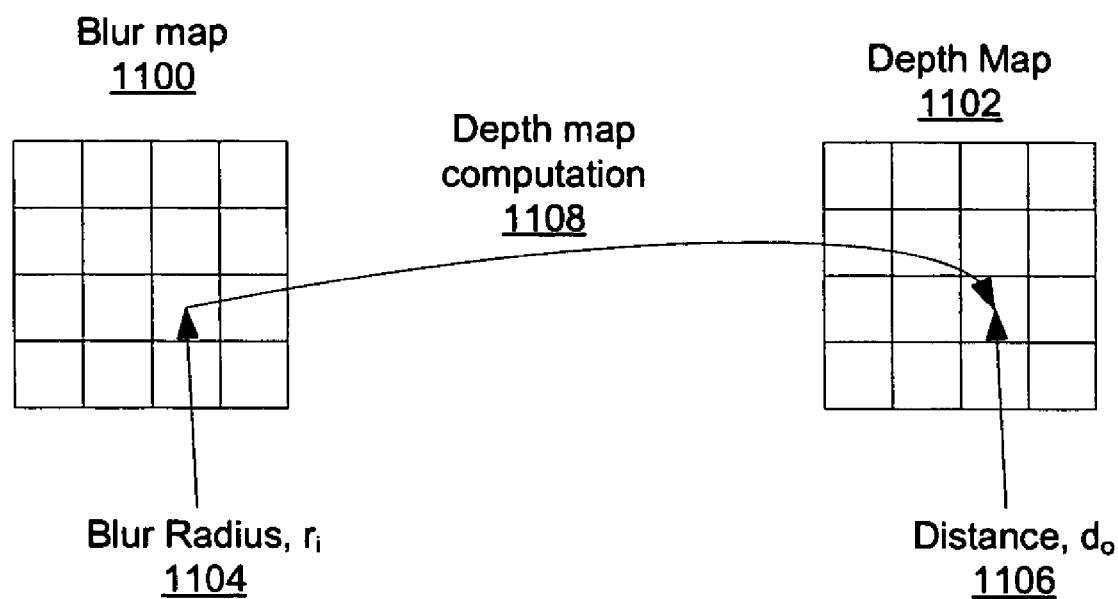
FIG. 11 illustrates one embodiment calculating the depth map from the blur map.

FIG. 11 illustrates one embodiment that calculates the depth map from the blur map. Specifically, FIG. 11 illustrates the process method 500 uses to convert from blur map 1100 to depth map 1102 by computation 1108. Computation 1108 is equivalent to Equation 1. Blur map 1100 contains N×N blur radius values. Method 600 derives the blur radius value for each analysis block as illustrated in FIG. 6, above. In addition, depth map 1102 contains N×N depth values with each depth value computed from the corresponding blur radius. For example, blur map entry 1104 has blur radius $r_i$ which correspond to depth value $d_0$ for depth map entry 1106.

Figure 12:
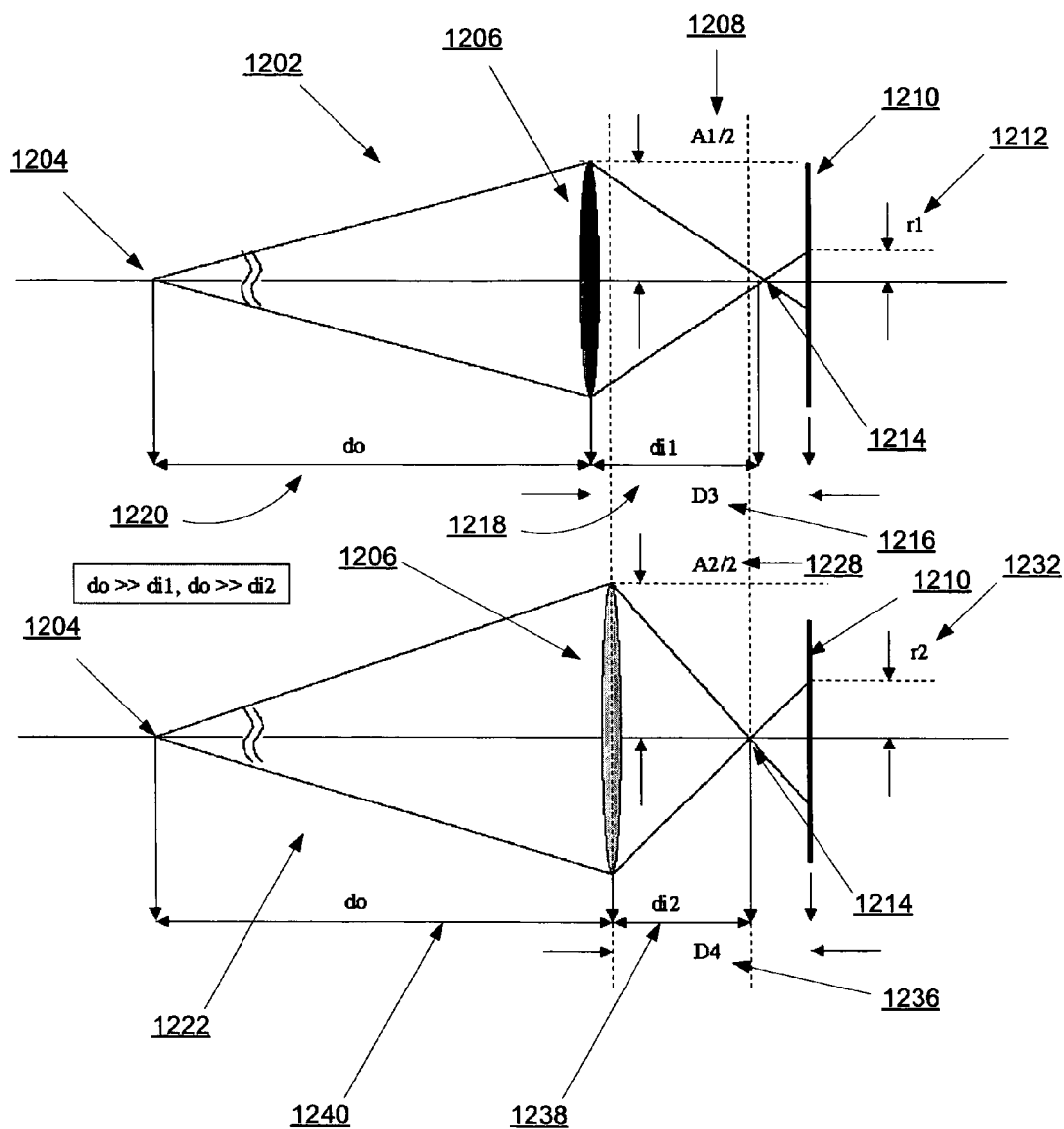
FIG. 12 illustrates one embodiment of two imaging optics settings used by imaging acquisition unit 102 used to capture two pictures with different focal position and aperture.

FIG. 12 illustrates one embodiment of two imaging optics settings used by imaging acquisition unit 102 used to capture two pictures with different aperture and focal position. In FIG. 12, imaging acquisition unit 102 uses optical setting 1202 to capture a first picture, $f_1$, of point 1204 that is a distance $d_o$ from lens 1206. Imaging acquisition unit 102 causes lens 1206 to uses a focus D3 1216, aperture A1 1208 and focal length f (not shown). The focal length is constant for the two optics settings 1202 and 1222. Furthermore, is it assumed for optics setting 1202 that $d_o$ is much greater than $d_{i1}$, where $d_{i1}$ is the distance 1218 between lens 1206 and a properly focused point image 1214. With these settings, image acquisition unit 102 captures a blurred image 1212 of point 1204 on image plane 1210 with blur radius 1212. If lens 1206 is properly focused on point 1204, then the image captured is point image 1214.

In addition, imaging acquisition unit 102 uses optics settings 1222 to capture the second picture, $f_2$. For the second picture, imaging acquisition unit 102 moves lens 1206 slightly closer to image plane 1210 (i.e. D4<D3) and, therefore, farther from point 1204. Even though lens 1206 has moved closer to point 1204, because $d_o$ is much greater than $d_{i1}$ and $d_{i2}$, it is assumed that the distance between lens 1206 and point 1204 is the same (i.e. $d_o$) for both optics settings. Furthermore, imaging acquisition unit uses optics settings 1222 for lens 1206 that consists of focus D4 1236, aperture A2 1228 and focal length f. Comparing optics setting 1222 and 1202, optics settings 1222 has a larger aperture and a closer focusing point. As a result, the second picture of point 1204 captured through lens 1206 with optics setting 1222 results in image 1232 with blur radius $r_2$ displayed on image plane 1210. Furthermore, is it assumed for optics setting 1222 that $d_o$ is much greater than $d_{i2}$, where $d_{i2}$ is the distance 1238 between lens 1206 and a properly focused point image 1214.

As illustrated in FIG. 12, optics setting 1222 results in image 1232 on image plane 1210 that has a larger blur radius, $r_2$, as compared with the blur radius, $r_1$, for image 1212 using optics model 1202. However, optics settings 1202 and 1222 are only an illustration of the relative blurring from one change in settings for one spatial scene (e.g., lens 1206 position in optics setting 1222 is to the right of lens 1206 position in optics setting 1202). Alternatively, a change in blur results from lens 1206 position in optics setting 1222 being to the left of lens 1206 position in optics setting 1202. In this embodiment, blur radius $r_2$ is smaller that $r_1$. Nevertheless, the change in blur is the information required. Thus, a change in blur occurs whether the second lens position is to the right or left of the first lens position. While the embodiments above describe measuring a blur change based on changing the lens position, alternate embodiments of changing different optical settings result in a change in blur as well (changing the aperture settings, etc.) and/or combination thereof.

In an exemplary embodiment, the difference between $r_1$ and $r_2$ should be large enough to be measurable, but not so large as to have blur radii with different blur directionality. Blur radii with different blur directionality (i.e. the front/back blur ambiguity) may occur for objects located at some physical distance range in the scene. This is difficult to avoid since the front/back blur ambiguity is an inherent property of the optics and the imaging setup. However, the range of distances in the scene where this occurs can be minimized by minimizing the absolute value of the difference between D3 1216 and D4 1236. In the limiting case where the absolute value of the difference between D3 1216 and D4 1236 is maximum, all objects in the scene (with the exception of the furthest focus object—the object at infinity—and the nearest focused object—the closest object the imaging system can focus on) will exhibit the front/back blur ambiguity.

Figure 13:
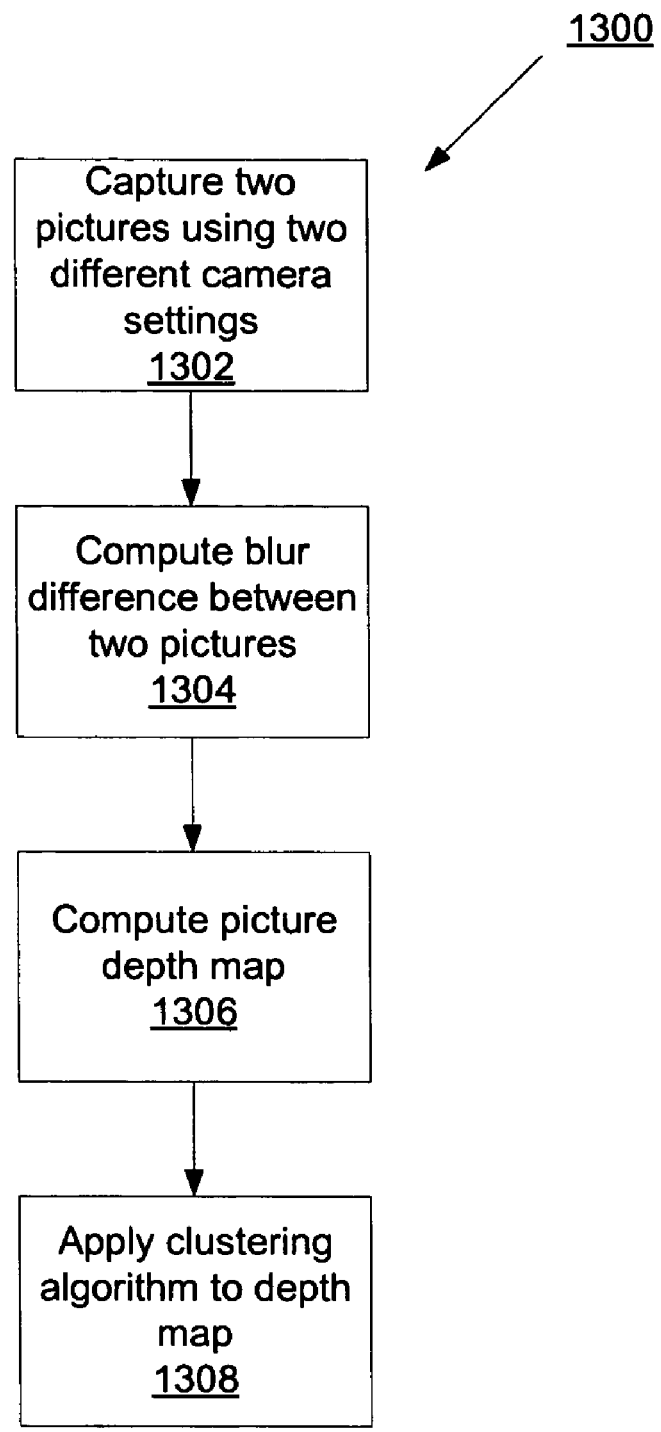
FIG. 13 is a flow chart of a method that calculates the depth map from two pictures taken with different focal position and aperture.

FIG. 13 is a flow chart of a method 1300 that calculates the depth map from two pictures taken with different focal positions and apertures, as illustrated in FIG. 12. At block 1302, method 1300 causes imaging acquisition unit 102 to capture two different pictures of spatial scene 110 using two differ optics settings 1202 and 1222, respectively, of FIG. 12. The different optics settings should give a difference in blur radius that is large enough to be measured, but not so large such that images 1212 and 1232 are on opposite sides of properly focused point image 1214. Method 1300 causes the capture of the first picture, $f_1$, with aperture A1, focus D3 and focal length f. Similarly, method 1300 causes the capture of the second picture, $f_2$, with aperture A2, focus D4 and focal length f. At block 1304, method 1300 calculates the blur difference matrix between the two pictures using method 700, described above.

At block 1306, method 1300 generates the depth map by direct computation using the blur difference matrix. From FIG. 12, the distance of an object to the lens for picture $f_1$ is as follows:

$$d_o = \frac{f * D3}{D3 - f - 2 * kr1 * f_{number1}} \quad (9)$$

Similarly, the distance of an object to the lens for picture $f_2$ is:

$$d_o = \frac{f * D4}{D4 - f - 2 * kr2 * f_{number2}} \quad (10)$$

Rewriting Equations 9 and 10 in terms of r1 and r2 and gives:

$$kr1 = \frac{d_o * D3 - d_o * f - f * D3}{2 * d_o * f_{number1}} \quad (11)$$

$$kr2 = \frac{d_o * D4 - d_o * f - f * D4}{2 * d_o * f_{number2}} \quad (12)$$

The blur difference, k(r1−r2), from Equations 11 and 12 is:

$$k(r1 - r2) = \frac{d_o * D3 - d_o * f - f * D3}{2 * d_o * f_{number1}} - \frac{d_o * D4 - d_o * f - f * D4}{2 * d_o * f_{number2}} \quad (13)$$

Equation 13 assumes that r1 is greater than r2. If $f_1$ has the larger variance, the blur radius in $f_1$ corresponds to r2 because r2 is assumed to be smaller than r1. Alternatively, if $f_1$ has smaller variance, the blur radius in $f_1$ corresponds to r2 because r1 is assumed to be larger than r2. If the $f_{number}$ ($f_{number}=f_{number1}=f_{number2}$) is the same for pictures $f_1$ and $f_2$, then Equation 13 reduces to:

$$k(r1 - r2) = \frac{d_o * (D3 - D4) - f * (D3 - D4)}{2 * d_o * f_{number}} \quad (14)$$

Equations 13 and 14 represent the blur difference as a function of blur radius. The relative blur difference map contains the value k(r1−r2). Equations 13 and 14 are rewritten to solve for distance, $d_o$:

$$d_o = \frac{f * (f_{number2} * D4 - f_{number1} * D3)}{2 * k * (r1 - r2) * f_{number1} * f_{number2} + f_{number1} * D4 - f_{number2} * D3 + f * (f_{number2} - f_{number1})} \quad (15)$$

$$d_o = \frac{f(D4 - D3)}{2 * k * f_{number} * (r1 - r2) + (D4 - D3)} \quad (16)$$

Since at the time of capturing the pictures, $f_{number1}$, $f_{number2}$, f, D3 and D4 (or equivalently, $f_{number}$, f, D3 and D4) are known and k(r1−r2) is stored in the blur difference matrix, method 1300 directly computes the depth map matrix from the blur difference matrix with Equation 15 or 16.

At block 1308, method 1300 applies a clustering algorithm to the depth map. The clustering algorithm is used to extract regions containing similar depths and to isolate regions corresponding to outliers and singularities. Clustering algorithms are well-known in the art. For example, in one embodiment, method 1300 applies nearest neighbor clustering to the picture depth map.

Figure 14:
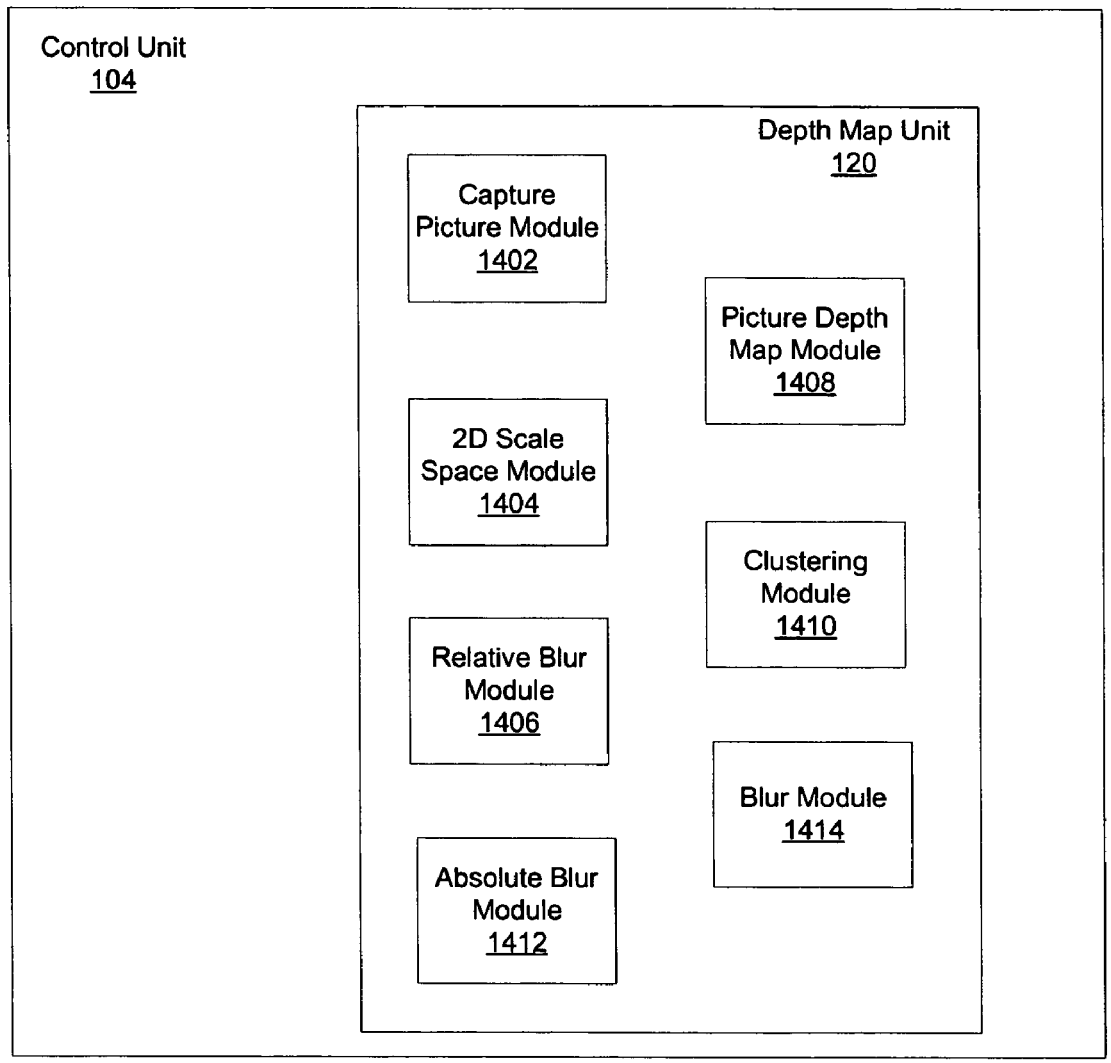
FIG. 14 is a block diagram illustrating one embodiment of an image device control unit that calculates a depth map.

FIG. 14 is a block diagram illustrating one embodiment of an image device control unit that calculates a depth map. In one embodiment, image control unit 104 contains depth map unit 120. Alternatively, image control unit 104 does not contain depth map unit 120, but is coupled to depth map unit 120. Depth map unit 120 comprises capture picture module 1402, 2D scale space module 1404, relative blur module 1406, picture depth map module 1408, clustering module 1410, absolute blur module 1412 and blur module 1414. Capture picture module 1402 causes imaging acquisition unit 102 to capture the two pictures as illustrated in FIG. 5, block 502 and FIGS. 13 at block 1302. 2D scale space module 1404 creates the 2D scale space representations of the captured pictures as illustrated in FIG. 6. Relative blur module 1406 derives the relative blur from captured pictures as illustrated in FIG. 6, blocks 602-618 and FIG. 7. In addition, picture depth map module 1408 calculates the depth map from blur module 1414. In one embodiment, where a (or the absolute value of a') is calculated and stored, blur module 1414 uses the geometric optics model and Equation 1 to compute the depth. In another embodiment, where k(r1−r2) is stored, blur module 1414 computes the depth using Equations 15 and 16. Clustering module 1410 applies a clustering algorithm to the depth map to extract regions containing similar depths and to isolate depth map regions corresponding to outliers and singularities as illustrated in FIG. 5, block 524 and FIG. 13, block 1308. Absolute blur module 1412 calculates the absolute blur inherent in imaging acquisition unit 102 as illustrated in FIG. 10, and described by Equation 8. Blur module 1414 calculates a blur quantity a (or a') using Equations 2 and 3 or a change in blur quantity (FIG. 13 at block 1304). If the latter is computed, the data in this module is the same as that found in relative blur module 1406.

In practice, the methods described herein may constitute one or more programs made up of machine-executable instructions. Describing the method with reference to the flowchart in FIGS. 5, 6, 10 and 13 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 15:
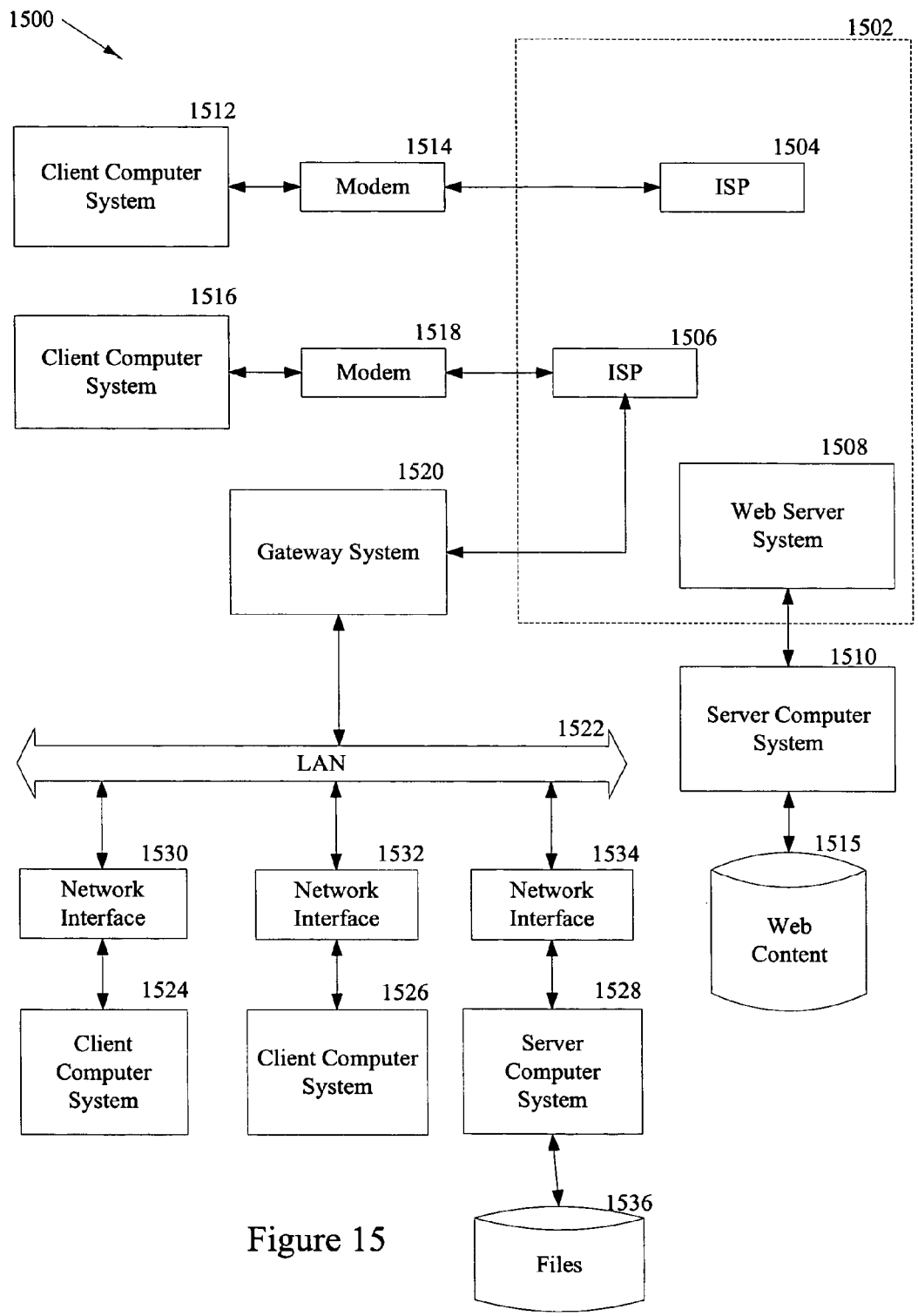
FIG. 15 is a diagram of one embodiment of an operating environment suitable for practicing the present invention.

FIG. 15 shows several computer systems 1500 that are coupled together through a network 1502, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1502 is typically provided by Internet service providers (ISP), such as the ISPs 1504 and 1506. Users on client systems, such as client computer systems 1512, 1516, 1524, and 1526 obtain access to the Internet through the Internet service providers, such as ISPs 1504 and 1506. Access to the Internet allows users of the client computer systems to exchange information, receive and send e-mails, and view documents, such as documents which have been prepared in the HTML format. These documents are often provided by web servers, such as web server 1508 which is considered to be "on" the Internet. Often these web servers are provided by the ISPs, such as ISP 1504, although a computer system can be set up and connected to the Internet without that system being also an ISP as is well known in the art.

The web server 1508 is typically at least one computer system which operates as a server computer system and is configured to operate with the protocols of the World Wide Web and is coupled to the Internet. Optionally, the web server 1508 can be part of an ISP which provides access to the Internet for client systems. The web server 1508 is shown coupled to the server computer system 1510 which itself is coupled to web content 1512, which can be considered a form of a media database. It will be appreciated that while two computer systems 1508 and 1510 are shown in FIG. 15, the web server system 1508 and the server computer system 1510 can be one computer system having different software components providing the web server functionality and the server functionality provided by the server computer system 1510 which will be described further below.

Client computer systems 1512, 1516, 1524, and 1526 can each, with the appropriate web browsing software, view HTML pages provided by the web server 1508. The ISP 1504 provides Internet connectivity to the client computer system 1512 through the modem interface 1514 which can be considered part of the client computer system 1512. The client computer system can be a personal computer system, a network computer, a Web TV system, a handheld device, or other such computer system. Similarly, the ISP 1506 provides Internet connectivity for client systems 1516, 1524, and 1526, although as shown in FIG. 15, the connections are not the same for these three computer systems. Client computer system 1516 is coupled through a modem interface 1518 while client computer systems 1524 and 1526 are part of a LAN. While FIG. 15 shows the interfaces 1514 and 1518 as generically as a "modem," it will be appreciated that each of these interfaces can be an analog modem, ISDN modem, cable modem, satellite transmission interface, or other interfaces for coupling a computer system to other computer systems. Client computer systems 1524 and 1516 are coupled to a LAN 1522 through network interfaces 1530 and 1532, which can be Ethernet network or other network interfaces. The LAN 1522 is also coupled to a gateway computer system 1520 which can provide firewall and other Internet related services for the local area network. This gateway computer system 1520 is coupled to the ISP 1506 to provide Internet connectivity to the client computer systems 1524 and 1526. The gateway computer system 1520 can be a conventional server computer system. Also, the web server system 1508 can be a conventional server computer system.

Alternatively, as well-known, a server computer system 1528 can be directly coupled to the LAN 1522 through a network interface 1534 to provide files 1536 and other services to the clients 1524, 1526, without the need to connect to the Internet through the gateway system 1520. Furthermore, any combination of client systems 1512, 1516, 1524, 1526 may be connected together in a peer-to-peer network using LAN 1522, Internet 1502 or a combination as a communications medium. Generally, a peer-to-peer network distributes data across a network of multiple machines for storage and retrieval without the use of a central server or servers. Thus, each peer network node may incorporate the functions of both the client and the server described above.

Figure 16:
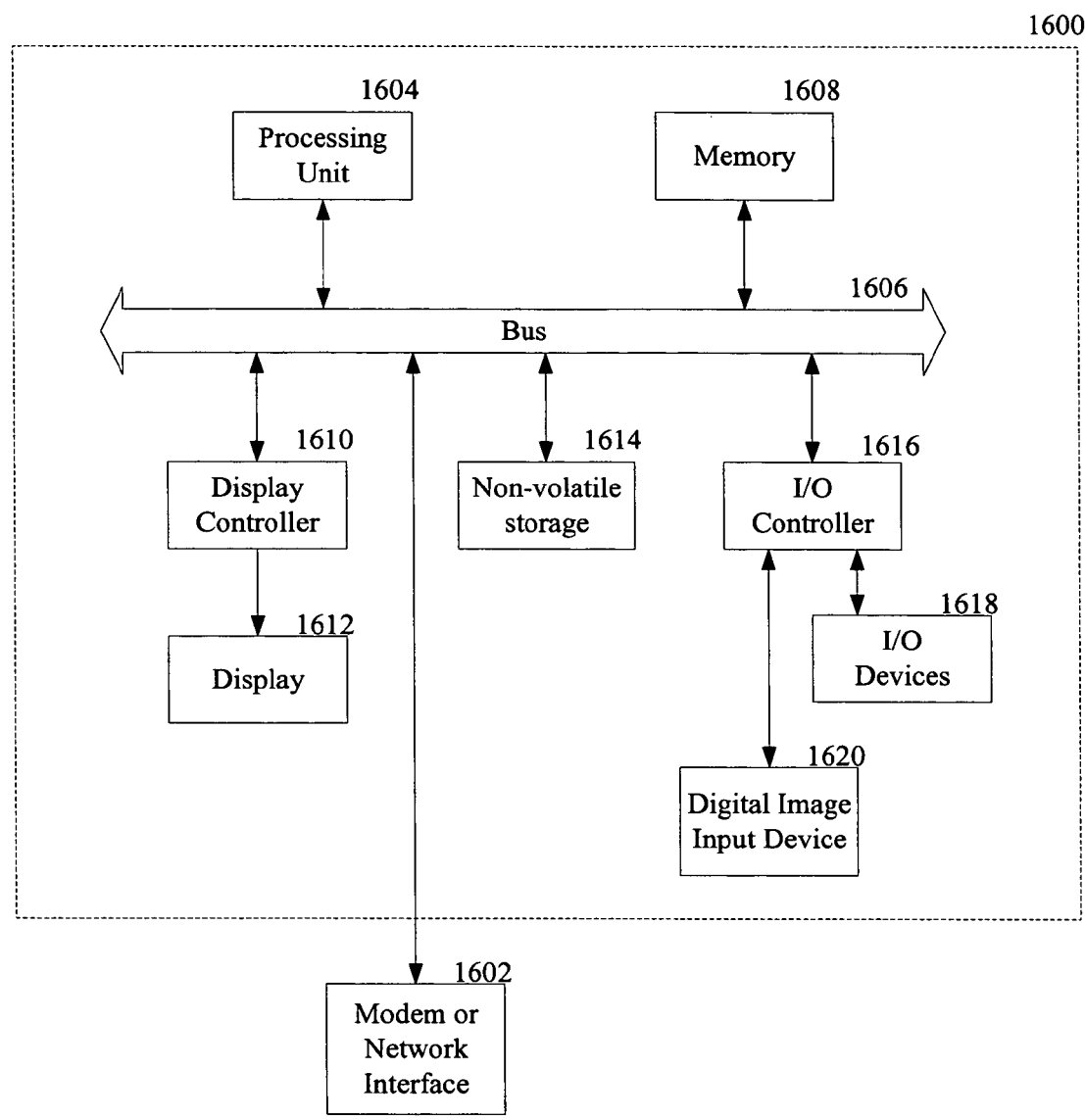
FIG. 16 a diagram of one embodiment of a computer system suitable for use in the operating environment of FIGS. 6 and 12.

The following description of FIG. 16 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 16 shows one example of a conventional computer system that can be used as encoder or a decoder. The computer system 1600 interfaces to external systems through the modem or network interface 1602. It will be appreciated that the modem or network interface 1602 can be considered to be part of the computer system 1600. This interface 1602 can be an analog modem, ISDN modem, cable modem, token ring interface, satellite transmission interface, or other interfaces for coupling a computer system to other computer systems. The computer system 1602 includes a processing unit 1604, which can be a conventional microprocessor such as an Intel Pentium microprocessor or Motorola Power PC microprocessor. Memory 1608 is coupled to the processor 1604 by a bus 1606. Memory 1608 can be dynamic random access memory (DRAM) and can also include static RAM (SRAM). The bus 1606 couples the processor 1604 to the memory 1608 and also to non-volatile storage 1614 and to display controller 1610 and to the input/output (I/O) controller 1616. The display controller 1610 controls in the conventional manner a display on a display device 1612 which can be a cathode ray tube (CRT) or liquid crystal display (LCD). The input/output devices 1618 can include a keyboard, disk drives, printers, a scanner, and other input and output devices, including a mouse or other pointing device. The display controller 1610 and the I/O controller 1616 can be implemented with conventional well known technology. A digital image input device 1620 can be a digital camera which is coupled to an I/O controller 1616 in order to allow images from the digital camera to be input into the computer system 1600. The non-volatile storage 1614 is often a magnetic hard disk, an optical disk, or another form of storage for large amounts of data. Some of this data is often written, by a direct memory access process, into memory 1608 during execution of software in the computer system 1600. One of skill in the art will immediately recognize that the terms "computer-readable medium" and "machine-readable medium" include any type of storage device that is accessible by the processor 1604 and also encompass a carrier wave that encodes a data signal.

Network computers are another type of computer system that can be used with the embodiments of the present invention. Network computers d$_0$ not usually include a hard disk or other mass storage, and the executable programs are loaded from a network connection into the memory 1608 for execution by the processor 1604. A Web TV system, which is known in the art, is also considered to be a computer system according to the embodiments of the present invention, but it may lack some of the features shown in FIG. 16, such as certain input or output devices. A typical computer system will usually include at least a processor, memory, and a bus coupling the memory to the processor.

It will be appreciated that the computer system 1600 is one example of many possible computer systems, which have different architectures. For example, personal computers based on an Intel microprocessor often have multiple buses, one of which can be an input/output (I/O) bus for the peripherals and one that directly connects the processor 1604 and the memory 1608 (often referred to as a memory bus). The buses are connected together through bridge components that perform any necessary translation due to differing bus protocols.

It will also be appreciated that the computer system 1600 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 1614 and causes the processor 1604 to execute the various acts required by the operating system to input and output data and to store data in memory, including storing files on the non-volatile storage 1614.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
generating two two-dimensional scale space representations from two different pictures of a three dimensional spatial scene, wherein the three dimensional spatial scene comprises a plurality of objects at different distances, each of the two-dimensional scale space representations comprises a plurality of pictures, and each of the plurality of pictures included in the respective scale space representation has a resolution that is the same as a resolution of a different picture corresponding to one of the two-dimensional scale space representation;
computing, with an imaging system, a relative blur between the two different pictures using the two two-dimensional scale space representations, wherein the computing the relative blur further includes matching, based on blur comparisons, each block from a first picture of the two pictures to a closest corresponding block in the two-dimensional scale space representation corresponding to the second picture of the two pictures; and
computing a picture depth map based on the relative blur, wherein an entry in the picture depth map has a corresponding entry in a blur map and the picture depth map is subsequently used to determine values for the different distances of the plurality of objects.

2. The computerized method of claim 1, wherein computing the relative blur between the two pictures comprises:
determining a relative blur value between closest corresponding block and the block from the first picture.

3. The computerized method of claim 2, wherein generating a two-dimensional scale space representation comprises applying a family of parametric convolving gaussian kernels to each of the two pictures.

4. The computerized method of claim 1, wherein the each block from the first picture includes a characteristic that is one of being blurrier than a corresponding block from the second picture and has a smaller picture block variance than a corresponding block from the second picture.

5. The computerized method of claim 1, further comprising:
applying a clustering algorithm to the depth map.

6. The computerized method of claim 1, wherein the computing the picture depth map further comprises:
computing the picture depth map based on the relative blur and an absolute blur contributed by an imaging acquisition unit.

7. The computerized method of claim 6, wherein computing the picture depth map comprises:
generating the two two-dimensional scale space representations from each of the two pictures;
generating the blur map from the two pictures and the two two-dimensional scale space representations; and
calculating, from a blur map entry, the picture depth map entry using the equation $$d_o = \frac{fD}{D - f - 2rf_{number}},$$

where f is a camera lens focal length, D is a distance between an image plane inside a camera and a lens, r is a blur radius of the image on the image plane and $f_{number}$ is an $f_{number}$ of the camera lens.

8. The computerized method of claim 1, wherein generating the blur map comprises:
computing a blur value from the relative blur value and an absolute blur; and
copying a blur value associated with a closest corresponding block into a corresponding entry of a relative blur difference map.

9. The computerized method of claim 1, wherein the two pictures are captured with an identical blur directionality.

10. The computerized method of claim 1, wherein the computing the picture depth map uses the equation $$d_o = \frac{f*(f_{number2}*D4 - f_{number1}*D3)}{2*k*(r1-r2)*f_{number1}*f_{number2} + f_{number1}*D4 - f_{number2}*D3 + f*(f_{number2} - f_{number1})},$$

where f is a camera focal length, D3 is a distance between an image plane inside a camera and a lens for the first picture, $f_{number1}$ is an $f_{number}$ of the camera lens for the first picture, D4 is a distance between the image plane inside the camera and the lens for the second picture, $f_{number2}$ is an $f_{number}$ of the camera lens for the second picture, k(r1−r2) is the relative blur.

11. The computerized method of claim 1, wherein the two pictures are captured with opposite blur directionality.

12. A non-transitory computer readable storage medium having executable instructions to cause a processor to perform a method comprising: generating two two-dimensional scale space representations from two different pictures of a three dimensional spatial scene, wherein the three dimensional spatial scene comprises a plurality of objects at different distances, each of the two-dimensional scale space representations comprises a plurality of pictures, and each of the plurality of pictures included in the respective scale space representation has a resolution that is the same as a resolution of a different picture corresponding to one of the two-dimensional scale space representation; computing a relative blur between the two different pictures using the two two-dimensional scale space representations, wherein the computing the relative blur further includes matching, based on blur comparison, each block from a first picture of the two pictures to a closest corresponding block in the two-dimensional scale space representation corresponding to the second picture of the two pictures; and computing a picture depth map based on the relative blur, wherein an entry in the picture depth map has a corresponding entry in a blur map and the picture depth map is subsequently used to determine values for the different distances of the plurality of objects.

13. The machine readable storage medium of claim 12, wherein computing the relative blur between the two pictures comprises:
determining a relative blur value between closest corresponding block and the block from the first picture.

14. The machine readable storage medium of claim 13, wherein the block from the first picture includes a characteristic that is one of being blurrier than a corresponding block from the second picture and has a smaller picture block variance than a corresponding block from the second picture.

15. The machine readable storage medium of claim 13, wherein generating a two-dimensional scale space representation comprises applying a family of parametric convolving gaussian kernels to each of the two pictures.

16. The machine readable medium of claim 12, further comprising:
applying a clustering algorithm to the depth map.

17. The machine readable storage medium of claim 12, wherein the computing the picture depth map further comprises:
   computing the picture depth map based on the relative blur and an absolute blur contributed by an imaging acquisition unit.

18. The machine readable storage medium of claim 17, wherein computing the picture depth map comprises:
   generating the two two-dimensional scale space representations from each of the two pictures;
   generating the blur map from the two pictures and the two two-dimensional scale space representations; and
   calculating, from a blur map entry, the picture depth map entry using the equation $$d_o = \frac{fD}{D - f - 2rf_{number}},$$

where f is a camera lens focal length, D is a distance between the image plane inside a camera and a lens, r is a blur radius of the image on the image plane and $f_{number}$ is an $f_{number}$ of the camera lens.

19. The machine readable storage medium of claim 18, wherein generating the relative blur difference map comprises:
   computing a blur value from the relative blur value and an absolute blur; and
   copying a blur value associated with a closest corresponding block into a corresponding entry of a relative blur difference map.

20. The machine readable storage medium of claim 12, wherein the two pictures are captured with an identical blur directionality.

21. The machine readable storage medium of claim 12, wherein the computing the picture depth map uses the equation $$d_o = \frac{f*(f_{number2}*D4 - f_{number1}*D3)}{2*k*(r1-r2)*f_{number1}*f_{number2} + f_{number1}*D4 - f_{number2}*D3 + f*(f_{number2} - f_{number1})},$$

where f is a camera focal length, D3 is a distance between the image plane inside a camera and a lens for the first picture, $f_{number1}$ is an $f_{number}$ of the camera lens for the first picture, D4 is a distance between the image plane inside the camera and the lens for the second picture, $f_{number2}$ is an $f_{number}$ of the camera lens for the second picture, k(r1-r2) is the relative blur.

22. The machine readable storage medium of claim 12, wherein the two pictures are captured with opposite blur directionality.

23. An apparatus comprising:
   means for generating two two-dimensional scale space representations from two different pictures of a three dimensional spatial scene, wherein the three dimensional spatial scene comprises a plurality of objects at different distances, each of the two-dimensional scale space representations comprises a plurality of pictures, and each of the plurality of pictures included in the respective scale space representation has a resolution that is the same as a resolution of a different picture corresponding to one of the two-dimensional scale space representation;
   means for computing a relative blur between the two different pictures using the two two-dimensional scale space representations, wherein the means for computing the relative blur further includes means for matching, based on blur comparisons, each block from a first picture of the two pictures to a closest corresponding block in the two-dimensional scale space representation corresponding to the second picture of the two pictures; and
   means for computing a picture depth map based on the relative blur, wherein an entry in the picture depth map has a corresponding entry in a blur map and the picture depth map is subsequently used to determine values for the different distances of the plurality of objects.

24. The apparatus of claim 23, wherein means for computing the relative blur between the two pictures comprises:
   means for determining a relative blur value between closest corresponding block and the block from the first picture.

25. The apparatus of claim 23, further comprising:
   means for applying a clustering algorithm to the depth map.

26. The apparatus of claim 23, wherein the means for computing the picture depth map further comprises:
   means for computing the picture depth map based on the relative blur and an absolute blur contributed by an imaging acquisition unit.

27. The apparatus of claim 26, wherein means for computing the picture depth map comprises:
   means for generating the two two-dimensional scale space representations from each of the two pictures;
   means for generating the blur map from the two pictures and the two-dimensional scale space representations; and
   means for calculating, from a blur map entry, the picture depth map entry using the equation $$d_o = \frac{fD}{D - f - 2rf_{number}},$$

where f is a camera lens focal length, D is a distance between the image plane inside a camera and a lens, r is a blur radius of the image on the image plane and $f_{number}$ is an $f_{number}$ of the camera lens.

28. The apparatus of claim 23, wherein the means for generating the blur map comprises:
   means for computing a blur value from the relative blur value and an absolute blur; and
   means for copying a blur value associated with a closest corresponding block into a corresponding entry of a relative blur difference map.

29. The apparatus of claim 23, wherein the computing the picture depth map uses the equation $$d_o = \frac{f*(f_{number2}*D4 - f_{number1}*D3)}{2*k*(r1-r2)*f_{number1}*f_{number2} + f_{number1}*D4 - f_{number2}*D3 + f*(f_{number2} - f_{number1})},$$

where is a camera focal length, D3 is a distance between the image plane inside a camera and a lens for the first picture, $f_{number1}$ is an $f_{number}$ of the camera lens for the first picture, D4 is a distance between the image plane inside the camera and the lens for the second picture, $f_{number2}$ is an $f_{number}$ of the camera lens for the second picture, k(r1-r2) is the relative blur.

30. A system comprising:
a processor;
a memory coupled to the processor though a bus; and
a process executed from the memory by the processor to cause the processor to generate two two-dimensional scale space representations from two different pictures of a three dimensional spatial scene, wherein the three dimensional spatial scene comprises a plurality of objects at different distances, each of the two-dimensional scale space representations comprises a plurality of pictures, and each of the plurality of pictures included in the respective scale space representation has a resolution that is the same as a resolution of a different picture corresponding to one of the two-dimensional scale space representation, compute a relative blur between the two different pictures using the two two-dimensional scale space representations, wherein the computing the relative blur further includes matching, based on blur comparisons, each block from a first picture of the two pictures to a closest corresponding block in the two-dimensional scale space representation corresponding to the second picture of the two pictures, and to compute a picture depth map based on the relative blur, wherein an entry in the picture depth map has a corresponding entry in a blur map and the picture depth map is subsequently used to determine values for the different distances of the plurality of objects.

31. The system of claim 30, wherein computing the relative blur between the two pictures comprises:
determining a relative blur value between closest corresponding block and the block from the first picture.

32. The system of claim 31, wherein the each block from the first picture includes a characteristic that is one of being blurrier than a corresponding block from the second picture and has a smaller picture block variance than a corresponding block from the second picture.

33. The system of claim 31, wherein generating a two-dimensional scale space representation comprises applying a family of parametric convolving gaussian kernels to each of the two pictures.

34. The system of claim 30, wherein the process further causes the processor to apply a clustering algorithm to the depth map.

35. The system of claim 30, wherein the computing the picture depth map further comprises:
computing the picture depth map based on the relative blur and an absolute blur contributed by an imaging acquisition unit.

36. The system of claim 35, wherein computing the picture depth map comprises:
generating the two two-dimensional scale space representations from each of the two pictures;
generating the blur map from the two pictures and the two two-dimensional scale space representation; and
calculating, from a blur map entry, the picture depth map entry using the equation $$d_o = \frac{fD}{D - f - 2rf_{number}},$$

where f is a camera lens focal length, D is a distance between an image plane inside a camera and a lens, r is a blur radius of the image on the image plane and $f_{number}$ is an $f_{number}$ of the camera lens.

37. The system of claim 35, wherein generating the blur map comprises:
computing a blur value from the relative blur value and an absolute blur; and
copying a blur value associated with a closest corresponding block into a corresponding entry of a relative blur difference map.

38. The system of claim 30, wherein the two pictures are captured with an identical blur directionality.

39. The system of claim 30, wherein the computing the picture depth map uses the equation $$d_o = \frac{f * (f_{number2} * D4 - f_{number1} * D3)}{2 * k * (r1 - r2) * f_{number1} * f_{number2} + f_{number1} * D4 - f_{number2} * D3 + f * (f_{number2} - f_{number1})},$$

where f is the camera focal length, D3 the distance between the image plane inside the camera and the lens for the first $f_{number1}$ is the $f_{number}$ of the camera lens for the first picture, D4 the distance between the image plane inside the camera and the lens for the second picture, $f_{number2}$ is the $f_{number1}$ of the camera lens for the second picture, k(r1−r2) is the relative blur.

40. The system of claim 30, wherein the two pictures are captured with opposite blur directionality.

* * * * *